(12) United States Patent
Nishita et al.

(10) Patent No.: US 6,855,195 B2
(45) Date of Patent: Feb. 15, 2005

(54) INK COMPOSITION AND INK JET RECORDING METHOD

(75) Inventors: Nobuhiro Nishita, Kanagawa (JP); Junichi Yamanouchi, Kanagawa (JP); Toshiki Fujiwara, Kanagawa (JP)

(73) Assignee: Fuji Photo Film Co., Ltd., Minami Ashigara (JP)

( * ) Notice: Subject to any disclaimer, the term of this patent is extended or adjusted under 35 U.S.C. 154(b) by 62 days.

(21) Appl. No.: 10/200,128

(22) Filed: Jul. 23, 2002

(65) Prior Publication Data

US 2003/0089274 A1 May 15, 2003

(30) Foreign Application Priority Data

Jul. 25, 2001 (JP) .................................... 2001-224805

(51) Int. Cl.[7] .......... C09D 11/02; C09B 29/42; C09B 29/09; C09B 37/00; C09B 39/00
(52) U.S. Cl. .......... 106/31.48; 106/31.5; 106/31.58; 106/31.59; 534/766; 534/768; 534/769; 534/765; 534/752
(58) Field of Search .......... 106/31.48, 31.5, 106/31.58, 31.59; 534/766, 768, 769, 765, 752; 347/100

(56) References Cited

U.S. PATENT DOCUMENTS

| | | | |
|---|---|---|---|
| 4,508,570 A | * 4/1985 | Fujii et al. | 106/31.43 |
| 4,885,272 A | * 12/1989 | Chapman et al. | 503/227 |
| 5,198,023 A | * 3/1993 | Stoffel | 106/31.32 |
| 5,466,790 A | * 11/1995 | Gruettner-Merten et al. | 534/753 |
| 5,626,655 A | 5/1997 | Pawlowski et al. | |
| 5,837,043 A | 11/1998 | Wong et al. | |
| 6,323,327 B1 | * 11/2001 | Tzikas et al. | 534/637 |
| 6,444,020 B1 | * 9/2002 | Seto et al. | 106/31.46 |
| 6,458,194 B1 | * 10/2002 | Mikoshiba et al. | 106/31.5 |
| 6,468,338 B1 | * 10/2002 | Evans et al. | 106/31.5 |
| 6,533,852 B2 | * 3/2003 | Hirose | 106/31.48 |
| 6,582,502 B2 | * 6/2003 | Fujiwara | 106/31.48 |
| 2002/0096082 A1 | * 7/2002 | Omatsu et al. | 106/31.5 |
| 2003/0097959 A1 | * 5/2003 | Omatsu et al. | 106/31.43 |
| 2003/0159617 A1 | * 8/2003 | Nishita et al. | 106/31.48 |

FOREIGN PATENT DOCUMENTS

| | | |
|---|---|---|
| JP | 58-074761 A | 5/1983 |
| JP | 60-092369 A | 5/1985 |
| JP | 2-212566 A | 8/1990 |
| JP | 04-022714 B2 | 4/1992 |
| JP | 06-088048 A | 3/1994 |
| JP | 08-333532 A | 12/1996 |
| JP | 08-333533 A | 12/1996 |
| JP | 2000-265098 A | 9/2000 |

\* cited by examiner

*Primary Examiner*—Helene Klemanski
(74) *Attorney, Agent, or Firm*—Burns, Doane, Swecker & Mathis, L.L.P.

(57) ABSTRACT

An ink composition comprising at least one of water-soluble dyes represented by the following formulae (1) to (3) and a surfactant:

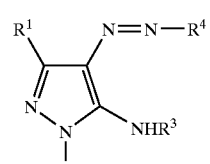

(1)

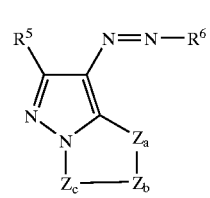

(2)

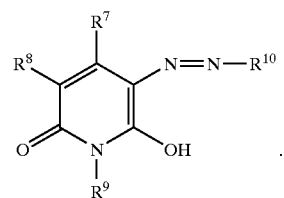

(3)

16 Claims, No Drawings

INK COMPOSITION AND INK JET RECORDING METHOD

FIELD OF THE INVENTION

The present invention relates to an ink composition for ink jet recording, which forms a recorded image with high quality, which are excellent in ink-ejecting stability, and which forms an image with excellent storage properties, and to an ink jet recording method using the same.

BACKGROUND OF THE INVENTION

In recent years, with the spread of computers, ink jet printers have come into wide use for printing on paper, film or cloth not only in offices but in individual houses as well.

Ink jet recording methods include a method of ejecting liquid droplets by applying pressure through piezo elements, a method of ejecting liquid droplets by generating a bubble in an ink through heat, a method of using ultrasonic waves and a method of attracting and ejecting liquid droplets by electrostatic power. As an ink for these ink jet recording methods, there are used aqueous inks, oily inks or solid (melting type) inks. Of these inks, aqueous inks are mainly used in view of productivity, handling properties, smell and stability.

Colorants to be used in these inks for jet recording methods are required to have a high solubility in a solvent, realize high-density recording, provide a good hue, have excellent fastness against light, heat, air, water and chemicals, show an enough good fixability for an image-receiving material not to be blurred, have an excellent keeping quality as an ink, have no toxicity, have a high purity and be available at a low price. However, it is extremely difficult to find colorants satisfying these requirements at high levels. In particular, colorants having a good yellow hue and an excellent light fastness have eagerly been desired.

Various dyes and pigments have already been proposed and have been practically used as colorants for ink jet recording but, up to now, there have been found no colorants which satisfy all of the requirements. It is difficult for those dyes and pigments which have conventionally been well known and which respectively have Color Index (C.I.) numbers to simultaneously satisfy the requirements for hue and fastness required for an ink for ink jet recording. Japanese Patent Laid-Open No. 212566/1990 discloses an ink jet ink intended to satisfy requirements for both hue and light fastness.

However, dyes used in the publication is insufficient with respect to improvement of hue and light fastness. The dyes described in the publication also involve problems with respect to moist heat fastness. Also, Japanese Patent Laid-Open No. 22714/1992 discloses thiadiazolyl-azo-pyrazole yellow dyes as dyes for thermal transfer recording. However, the dyes have such an insufficient solubility in an aqueous solution that they cannot be used in a water-soluble ink for ink jet recording.

On the other hand, Japanese Patent Laid-Open No. 74761/1983 and Japanese Patent Laid-Open No. 92369/1985 describe inks comprising a dye, glycerin and an ethylene oxide adduct of diethylene glycol or an alcohol and, further, Japanese Patent Laid-Open No. 265098/2000 describes to use an ethylene oxide adduct of a long, straight-chain alcohol. However, these techniques are still insufficient and involve the defect that image quality of a formed image will be deteriorated during storage.

In addition, Japanese Patent Laid-Open Nos. 88048/1993, 333532/1996 and 333533/1996, and U.S. Pat. Nos. 5,837,043 and 5,626,655 propose that blurring of an image can be reduced by an ink using an ethylene oxide adduct of a higher alcohol. However, this technique has the defects that the ink is liable to cause clogging and that image preservability of a printed image is so poor that the image suffers change in color tone.

SUMMARY OF THE INVENTION

An object of the present invention is to provide an ink composition which shows a highly stable ejection and which forms images with no defects with respect to image quality such as hue, weatherability, water fastness and blurring, in particular, an ink composition for ink jet recording.

Another object of the invention is to provide an ink jet recording method which enables to form an image with excellent hue, weatherability and water fastness and which solves the problem of blurring by a group showing an excellent ejection stability.

The above-described objects can be attained by the ink composition and the ink jet recording method described below. That is, the invention provides an ink composition and an ink jet recording method of the following constitution.

1. An ink composition containing at least one of water-soluble dyes represented by the following formulae (1) to (3) and a surfactant:

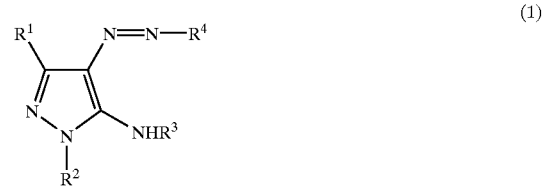

wherein $R^1$, $R^2$ and $R^3$ each independently represent a hydrogen atom, a halogen atom, a cyano group, an alkyl group, a cycloalkyl group, an aralkyl group, an aryl group, an alkylthio group, an arylthio group or ionic hydrophilic group, and $R^4$ represents an optionally substituted heterocyclic group selected from the following Group 1 of heterocyclic groups, provided that the water-soluble dyes represented by the formula (1) have at least one ionic hydrophilic group within the molecule;

Group 1 of Heterocyclic Groups:

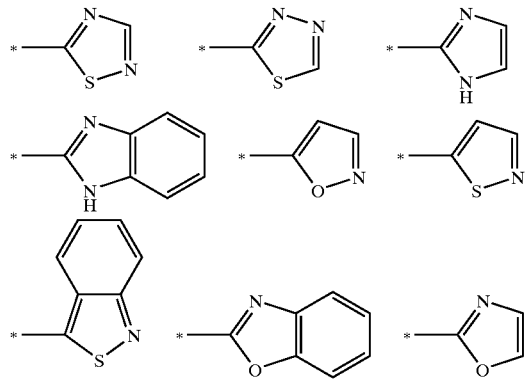

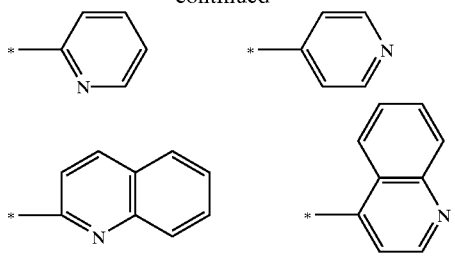

wherein * represents a linking position;

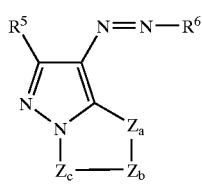 (2)

wherein R⁵ represents a hydrogen atom, a cyano group, an alkyl group, a cycloalkyl group, an aralkyl group, an aryl group, an alkylthio group, an arylthio group or an ionic hydrophilic group, Za represents —N=, —NH— or —C(R¹¹)=, and Zb and Zc each independently represent —N= or —C(R¹¹)= (wherein R¹¹ represents a hydrogen atom or a non-metallic substituent), and R⁶ represents an optionally substituted heterocyclic group selected from the following Group 2 of heterocyclic groups, provided that the water-soluble dyes represented by the formula (2) have at least one ionic hydrophilic group within the molecule;

Group 2 of Heterocyclic Groups:

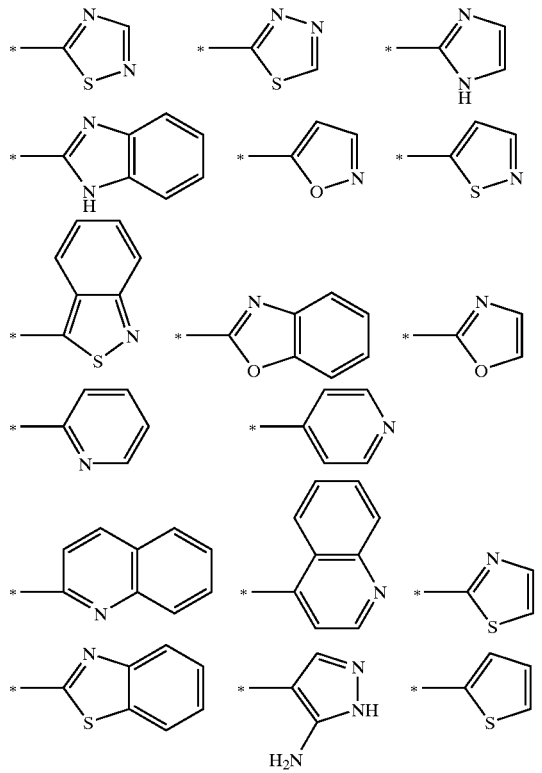

wherein * represents a linking position; and

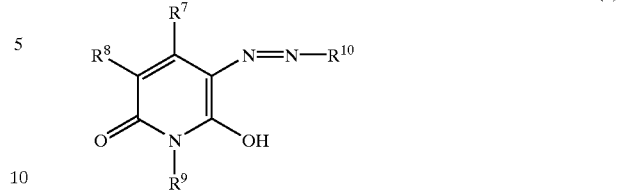 (3)

wherein R⁷ and R⁹ each independently represent a hydrogen atom, a cyano group, an alkyl group, a cycloalkyl group, an aralkyl group, an aryl group, an alkylthio group, an arylthio group or an ionic hydrophilic group, R⁸ represents a hydrogen atom, a halogen atom, an alkyl group, an alkoxy group, an aryl group, an aryloxy group, a cyano group, an acylamino group, a sulfonylamino group, an alkoxycarbonylamino group, a ureido group, an alkylthio group, an arylthio group, an alkoxycarbonyl group, a carbamoyl group, a sulfamoyl group, a sulfonyl group, an acyl group, an alkylamino group, an arylamino group, a hydroxyl group or an ionic hydrophilic group, and R¹⁰ represents an optionally substituted heterocyclic group selected from the following Group 3 of heterocyclic groups, provided that the water-soluble dyes represented by the formula (3) have at least one ionic hydrophilic group within the molecule;

Group 3 of Heterocyclic Groups:

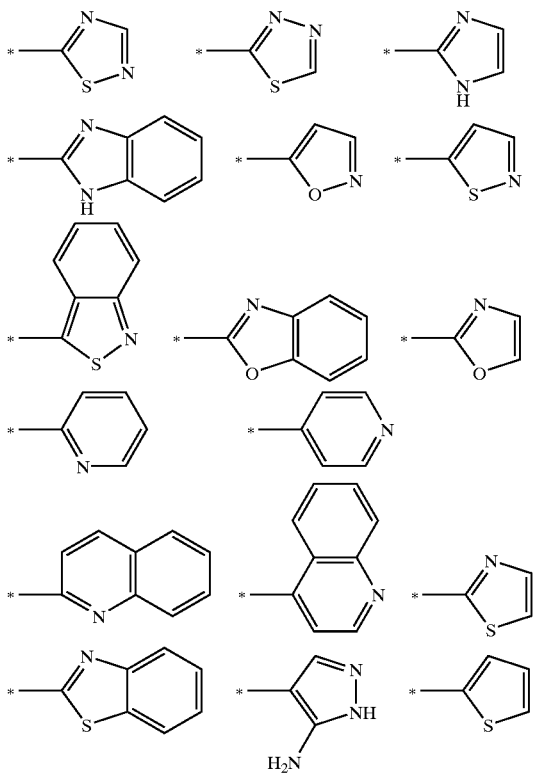

wherein * represents a linking position.

2. The ink composition as described in 1 above, wherein the surfactant is a nonionic surfactant.

3. The ink composition as described in 2 above, wherein the surfactant is represented by the following formula (I) or (II):

$$R_1O\text{-}(CH_2CH_2O)_{m^1}\text{-}H \quad (I)$$

wherein $R_1$ represents an alkyl group containing 5 to 40 carbon atoms, and $m^1$ represents an average number of added ethylene oxide of 2 to 40;

  (II)

wherein $R_2$ represents an alkyl group containing 5 to 40 carbon atoms, and $m^2$ represents an average number of added ethylene oxide of 2 to 40.

4. The ink composition as described in 2 above, wherein the surfactant is represented by the following formula (III):

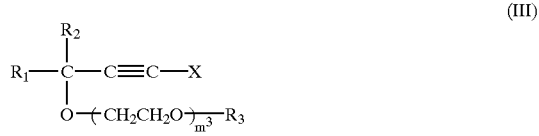  (III)

wherein $R_1$ and $R_2$ each independently represent an alkyl group containing 1 to 18 carbon atoms, $R_3$ represents a hydrogen atom, an alkyl group containing 1 to 6 carbon atoms or a phenyl group, X represents a hydrogen atom or a group represented by the following formula:

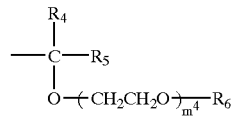

wherein $R_4$ and $R_5$ each independently represents an alkyl group containing 1 to 18 carbon atoms, $R_6$ represents a hydrogen atom, an alkyl group containing 1 to 6 carbon atoms or a phenyl group, and $m^3$ and $m^4$ each independently represents an average mol number of added ethylene oxide, with $m^3+m^4$ being a number of 0 to 100, provided that, when $m^3=0$, $R_3$ represents a hydrogen atom and, when $m^4=0$, $R_6$ represents a hydrogen atom and that, when X represents a hydrogen atom, $m^3$ is a number of 1 to 100.

5. An ink jet recording method, which comprises using the ink composition described in one of 1 to 4 above.

6. An ink jet recording method by ejecting ink droplets according to recording signals onto an image-receiving material comprising a support having provided thereon an image-receiving layer containing white inorganic pigment particles, in which the ink droplets comprise the ink composition described in one of 1 to 4 above.

DETAILED DESCRIPTION OF THE INVENTION

The invention is described in more detail below.

The ink composition of the invention contains at least one of water-soluble dyes represented by the above formulae (1) to (3) and a surfactant, preferably at least one of nonionic surfactants represented by the above formulae (I) to (III).

First, the water-soluble dyes represented by the above formulae (1) to (3) are described.

The water-soluble dyes represented by the above formulae (1) to (3) and to be contained in the ink composition of the invention include yellow dyes and show a sharp peak in the absorption spectra thereof. Of these, those yellow dyes are preferred aqueous solutions of which show a ratio of an absorbance of $I\lambda_{max+70}$ at $\lambda_{max+70}$ (nm) in the absorption spectrum of the aqueous solution to an absorbance of $I\lambda_{max}$ at $\lambda_{max}$ (nm) (i.e., $I\lambda_{max+70}/I\lambda_{max}$) of 0.2 or less.

In the formulae (1) to (3), $R^1$, $R^2$, $R^3$, $R^5$, $R^7$ and $R^9$ each independently represent a hydrogen atom, a halogen atom, a cyano group, an alkyl group, a cycloalkyl group, an aralkyl group, an aryl group, an alkylthio group, an arylthio group or an ionic hydrophilic group.

The alkyl group represented by $R^1$, $R^2$, $R^3$, $R^5$, $R^7$ or $R^9$ include substituted alkyl groups and non-substituted alkyl groups. As the alkyl group, alkyl groups containing 1 to 12 carbon atoms are preferred. Examples of the substituents include a hydroxyl group, an alkoxy group, a cyano group, a halogen atom and an ionic hydrophilic group. Examples of the alkyl group include methyl, ethyl, butyl, isopropyl, t-butyl, hydroxyethyl, methoxyethyl, cyanoethyl, trifluoromethyl, 3-sulfopropyl and 4-sulfobutyl.

The cycloalkyl group represented by $R^1$, $R^2$, $R^3$, $R^5$, $R^7$ or $R^9$ include substituted cycloalkyl groups and non-substituted cycloalkyl groups. As the cycloalkyl group, cycloalkyl groups containing 5 to 12 carbon atoms are preferred. Examples of the substituents include ionic hydrophilic groups. Examples of the cycloalkyl group include cyclohexyl.

The aralkyl group represented by $R^1$, $R^2$, $R^3$, $R^5$, $R^7$ or $R^9$ include substituted aralkyl groups and non-substituted aralkyl groups. As the aralkyl group, aralkyl groups containing 7 to 12 carbon atoms are preferred. Examples of the substituents include ionic hydrophilic groups. Examples of the aralkyl group include benzyl and 2-phenethyl.

The aryl group represented by $R^1$, $R^2$, $R^3$, $R^5$, $R^7$ or $R^9$ include substituted aryl groups and non-substituted aryl groups. As the aryl group, aryl groups containing 7 to 12 carbon atoms are preferred. Examples of the substituents include an alkyl group, an alkoxy group, a halogen atom, an alkylamino group and an ionic hydrophilic group. Examples of the aryl group include phenyl, p-tolyl, p-methoxyphenyl, o-chlorophenyl and m-(3-sulfopropylamio)phenyl.

The alkylthio group represented by $R^1$, $R^2$, $R^3$, $R^5$, $R^7$ or $R^9$ include substituted alkylthio groups and non-substituted alkylthio groups. As the alkylthio group, alkylthio groups containing 1 to 12 carbon atoms are preferred. Examples of the substituents include ionic hydrophilic groups. Examples of the alkylthio group include methylthio and ethylthio.

The arylthio group represented by $R^1$, $R^2$, $R^3$, $R^5$, $R^7$ or $R^9$ include substituted arylthio groups and non-substituted arylthio groups. As the arylthio group, arylthio groups containing 6 to 12 carbon atoms are preferred. Examples of the substituents include an alkyl group and an ionic hydrophilic group. Examples of the arylthio group include phenylthio and ptolylthio.

The ionic hydrophilic group represented by $R^1$, $R^2$, $R^3$, $R^5$, $R^7$ or $R^9$ include a sulfo group, a phosphono group, a carboxyl group and a quaternary ammonium group. Of these, a sulfo group and a carboxyl group are preferred, with a sulfo group being particularly preferred. The carboxyl group and the sulfo group may be in the form of a salt. Examples of salt-forming counter ions include an alkali metal ion (e.g., sodium ion or potassium ion), an ammonium ion and an organic cation (e.g., tetramethylguanidium ion).

In the formula (3), $R^8$ represents a hydrogen atom, a halogen atom, an alkyl group, an alkoxy group, an aryl group, an aryloxy group, a cyano group, an acylamino group, a sulfonylamino group, an alkoxycarbonylamino group, a ureido group, an alkylthio group, an arylthio group, an alkoxycarbonyl group, a carbamoyl group, a sulfamoyl group, a sulfonyl group, an acyl group, an alkylamino group, an arylamio group, a hydroxyl group or an ionic hydrophilic group.

The halogen atom represented by $R^8$ includes a fluorine atom, a chlorine atom and a bromine atom.

The alkyl group represented by $R^8$ includes a substituted alkyl group and a non-substituted alkyl group. Preferred examples of the alkyl group are alkyl groups containing 1 to 12 carbon atoms. Examples of the substituent include a hydroxyl group, an alkoxy group, a cyano group, a halogen atom and an ionic hydrophilic group. Examples of the alkyl group include methyl, ethyl, butyl, isopropyl, t-butyl-hydroxyethyl, methoxyethyl, cyanoethyl, trifluoromethyl, 3-sulfopropyl and 4-sulfobutyl.

The alkoxy group represented by $R^8$ includes a substituted alkoxy group and a non-substituted alkoxy group. Preferred examples of the alkoxy group are alkoxy groups containing 1 to 12 carbon atoms. Examples of the substituent include a hydroxyl group and an ionic hydrophilic group. Examples of the alkoxy group include methoxy, ethoxy, isopropoxy, methoxyethoxy, hydroxyethoxy and 3-carboxypropoxy.

The aryl group represented by $R^8$ includes a substituted aryl group and a non-substituted aryl group. Preferred examples of the aryl group are aryl groups containing 7 to 12 carbon atoms. Examples of the substituent include an alkyl group, an alkoxy group, a halogen atom, an alkylamino group and an ionic hydrophilic group. Examples of the aryl group include phenyl, p-tolyl, p-methoxyphenyl, o-chlorophenyl and m-(3-sulfopropylamino)phenyl.

The aryloxy group represented by $R^8$ includes a substituted aryloxy group and a non-substituted aryloxy group. Preferred examples of the aryloxy group are aryloxy groups containing 6 to 12 carbon atoms. Examples of the substituent include an alkoxy group and an ionic hydrophilic group. Examples of the aryloxy group include phenoxy, p-methoxyphenoxy and o-methoxyphenoxy.

The acylamino group represented by $R^8$ includes a substituted acylamino group and a non-substituted acylamino group. Preferred examples of the acylamino group are acylamino groups containing 2 to 12 carbon atoms. Examples of the substituent include an ionic hydrophilic group. Examples of the acylamino group include acetamido, propionamido, benzamido and 3,5-disulfobenzamido.

The sulfonylamino group represented by $R^8$ includes a substituted sulfonylamino group and a non-substituted sulfonylamino group. Preferred examples of the sulfonylamino group are sulfonylamino groups containing 2 to 12 carbon atoms. Examples of the sulfonylamino group include methylsulfonylamino and ethylsulfonylamino.

The alkoxycarbonylamino group represented by $R^8$ includes a substituted alkoxycarbonylamino group and a non-substituted alkoxycarbonylamino group. Preferred examples of the alkoxycarbonylamino group are alkoxycarbonylamino groups containing 2 to 12 carbon atoms. Examples of the substituent include an ionic hydrophilic group. Examples of the alkoxycarbonylamino group include ethoxycarbonylamino.

The ureido group represented by $R^8$ includes a substituted ureido group and a non-substituted ureido group. Preferred examples of the ureido group are ureido groups containing 1 to 12 carbon atoms. Examples of the substituent include an alkyl group and an aryl group. Examples of the ureido group include 3-methylureido, 3,3-dimethylureido and 3-phenylureido.

The alkylthio group represented by $R^8$ includes a substituted alkylthio group and a non-substituted alkylthio group. Preferred examples of the alkylthio group are alkylthio groups containing 1 to 12 carbon atoms. Examples of the substituent include an ionic hydrophilic group. Examples of the alkyllthio group include methylthio and ethylthio.

The arylthio group represented by $R^8$ includes a substituted arylthio group and a non-substituted arylthio group. Preferred examples of the arylthio group are arylthio groups containing 6 to 12 carbon atoms. Examples of the substituent include an alkyl group and an ionic hydrophilic group. Examples of the aryllthio group include phenylthio and p-tolylthio.

The alkoxycarbonyl group represented by $R^8$ includes a substituted alkoxycarbonyl group and a non-substituted alkoxycarbonyl group. Preferred examples of the alkoxycarbonyl group are alkoxycarbonyl groups containing 2 to 12 carbon atoms. Examples of the substituent include an ionic hydrophilic group. Examples of the alkoxycarbonyl group include methoxycarbonyl and ethoxycarbonyl.

The carbamoyl group represented by $R^8$ includes a substituted carbamoyl group and a non-substituted carbamoyl group. Examples of the substituent include an alkyl group. Examples of the carbamoyl group include methylcarbamoyl and dimethylcarbamoyl.

The sulfamoyl group represented by $R^8$ includes a substituted sulfamoyl group and a non-substituted sulfamoyl group. Examples of the substituent include an alkyl group. Examples of the sulfamoyl group include dimethylsulfamoyl and di-(2-hydroxyethyl)sulfamoyl.

Examples of a sulfonyl group represented by $R^8$ includes methanesulfonyl and phenylsulfonyl.

The acyl group represented by $R^8$ includes a substituted acyl group and a non-substituted acyl group. Preferred examples of the acyl group are acyl groups containing 1 to 12 carbon atoms. Examples of the substituent include an ionic hydrophilic group. Examples of the acyl group include acetyl and benzoyl.

The alkylamino group represented by $R^8$ includes a substituted alkylamino group and a non-substituted alkylamino group. Preferred examples of the alkylamino group are alkylamino groups containing 1 to 6 carbon atoms. Examples of the substituent include an ionic hydrophilic group. Examples of the alkylamino group include methylamino and diethylamino. The arylamino group represented by $R^8$ includes a substituted arylamino group and a non-substituted arylamino group. Preferred examples of the acyl group are arylamino groups containing 6 to 12 carbon atoms. Examples of the substituent include a halogen atom and an ionic hydrophilic group. Examples of the arylamino group include anilino and 2-chloroanilino.

The ionic hydrophilic group represented by $R^8$ includes a sulfo group, a phosphono group, a carboxyl group and a quaternary ammonium. Of these, a sulfo group and a carboxyl group are preferred, with the sulfo group being particularly preferred. The carboxyl group and the sulfo group may be in the form of a salt thereof, and examples of a counter ion forming the salt include an alkali metal ion (e.g., sodium ion or potassium ion) and an organic cation (e.g., tetramethylguanidium ion).

In the formula (2), Za represents —N=, —NH— or —C($R^{11}$)=, Zb and Zc each independently represent —N= or —C($R^{11}$)=, and $R^{11}$ represents a hydrogen atom or a non-metallic substituent. As the non-metallic substituent represented by $R^{11}$, a cyano group, a cycloalkyl group, an aralkyl group, an aryl group, an alkylthio group, an arylthio group or an ionic hydrophilic group is preferred. Each of the substituents is the same as each of those represented by the foregoing $R^{11}$, and preferred examples thereof are also the same. Examples of the skeleton of hetero ring composed of two 5-membered rings and contained in the formula (2) are shown below:

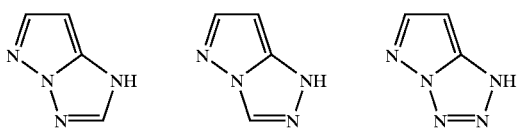

In the formula (1), $R^4$ represents an optionally substituted heterocyclic group selected from the Group 1 of heterocyclic groups. Examples of the substituent include an ionic hydrophilic group, an alkyl group containing 1 to 12 carbon atoms, an aryl group, an alkyl- or aryl-thio group, a halogen atom, a cyano group, a sulfamoyl group, a sulfonamino group, a carbamoyl group and an acylamino group, with the alkyl group and the aryl group being optionally further substituted. Of the heterocyclic groups of the Group 1, 1,2,4-thiadiazole, 1,3,4-thiadiazole and imidazole are preferred.

In the formula (2), $R^6$ represents an optionally substituted heterocyclic group selected from the Group 2 of heterocyclic groups. Examples of the substituent include an ionic hydrophilic group, an alkyl group containing 1 to 12 carbon atoms, an aryl group, an alkyl- or aryl-thio group, a halogen atom, a cyano group, a sulfamoyl group, a sulfonamino group, a carbamoyl group and an acylamino group, with the alkyl group and the aryl group being optionally further substituted. Of the heterocyclic groups of the Group 2, 1,2,4-thiadiazole, 1,3,4-thiadiazole, imidazole, benzothiazole and benzoxazole are preferred.

In the formula (3), $R^{10}$ represents an optionally substituted heterocyclic group selected from the Group 3 of heterocyclic groups. Examples of the substituent include an ionic hydrophilic group, an alkyl group containing 1 to 12 carbon atoms, an aryl group, an alkyl- or aryl-thio group, a halogen atom, a cyano group, a sulfamoyl group, a sulfonamino group, a carbamoyl group and an acylamino group, with the alkyl group and the aryl group being optionally further substituted. Of the heterocyclic groups of the Group 3, 1,2,4-thiadiazole, 1,3,4-thiadiazole, imidazole, benzothiazole and benzoxazole are preferred.

The water-soluble dyes represented by the formulae (1) to (3) have at least one ionic hydrophilic group within the molecule. Such dyes include those water-soluble dyes which are represented by the formulae (1) to (3) wherein $R^1$, $R^2$, $R^3$, $R^5$, $R^7$, $R^8$ or $R^9$ is the ionic hydrophilic group and those water-soluble dyes which are represented by the formulae (1) to (3) wherein $R^1$ to $R^{11}$ further contain the ionic hydrophilic group as a substituent. As is described above, the water-soluble dyes have the ionic hydrophilic group or groups within the molecule, and hence they show a good solubility or dispersibility in an aqueous medium. The ionic hydrophilic group include a sulfo group, a phosphono group, a carboxyl group and a quaternary ammonium salt. Of these, the sulfo group and the carboxyl group are preferred, with the sulfo group being particularly preferred. In addition, the water-soluble dyes may contain two or more kinds of the ionic hydrophilic groups and, in the case where two or more kinds of the ionic hydrophilic groups are contained, a combination of the carboxyl group and the sulfo group is preferred. The carboxyl group and the sulfo group may be in the form of salts. Examples of a counter ion forming the salt include an alkali metal ion (e.g., sodium ion or potassium ion) aan ammonium ion and an organic cation (e.g., tetramethylguanidium ion).

Specific examples (1-1 to 1-16) of the water-soluble dyes represented by the formula (1), specific examples (2-1 to 2-20) of the water-soluble dyes represented by the formula (2), and specific examples (3-1 to 3-12) of the water-soluble dyes represented by the formula (3) are shown below which, however, do not limit the dyes to be used in the invention.

1-1

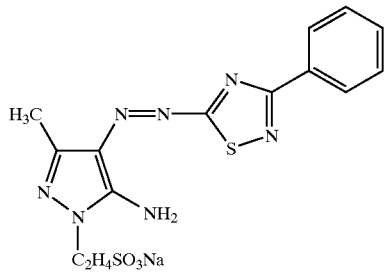

1-2

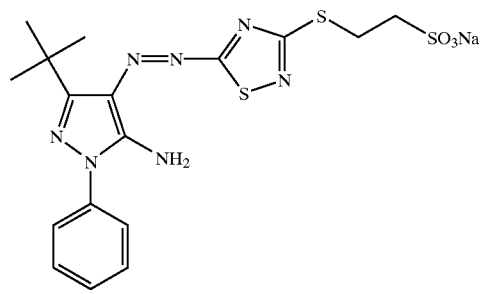

1-3

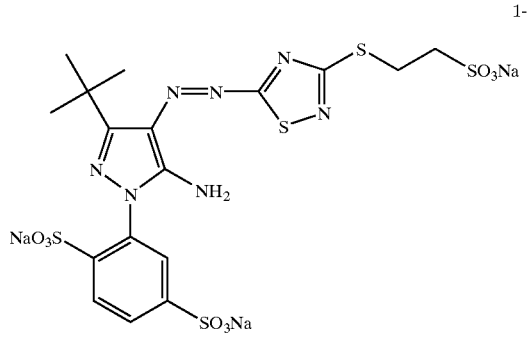

1-4

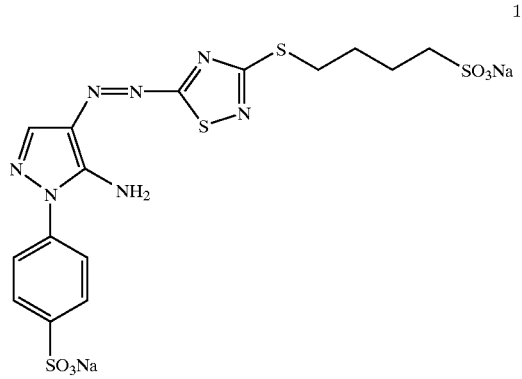

1-5

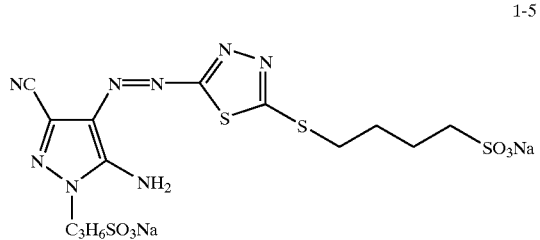

1-6
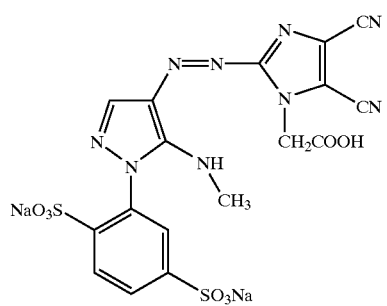
1-7
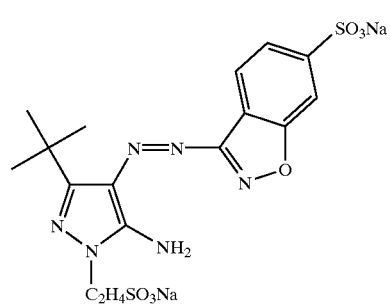
1-8
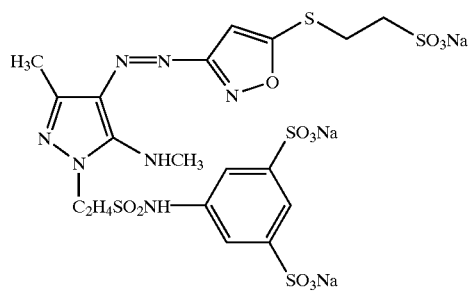
1-9
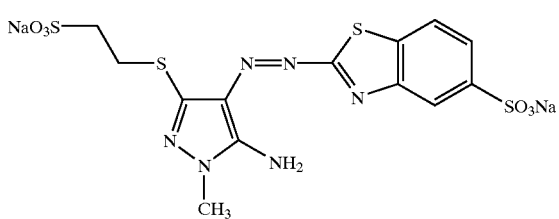
1-10
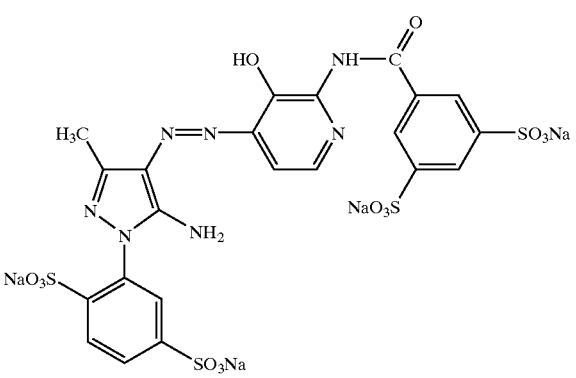
1-11
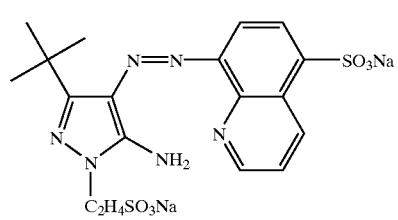
1-12
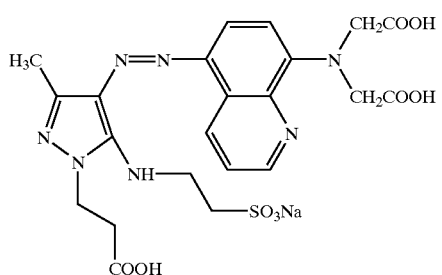
1-13
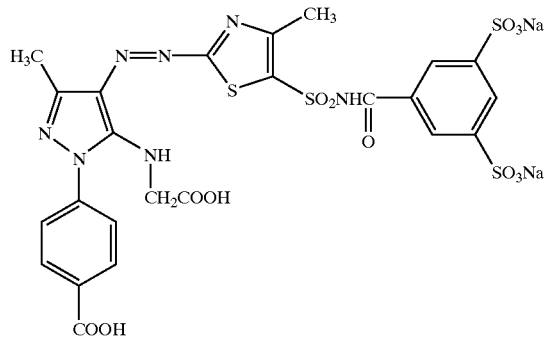
1-14
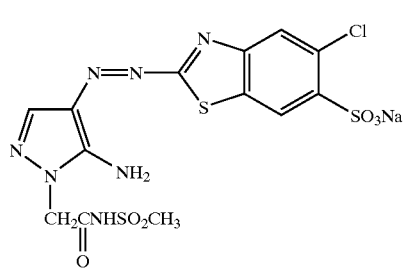
1-15
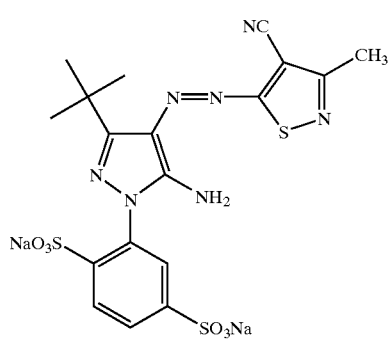

1-16
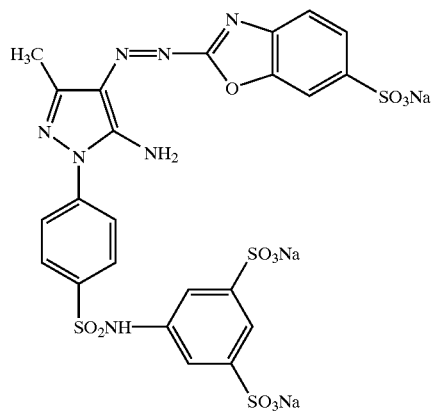
1-17
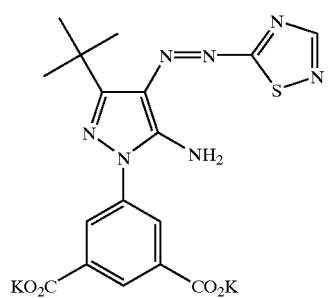
2-1
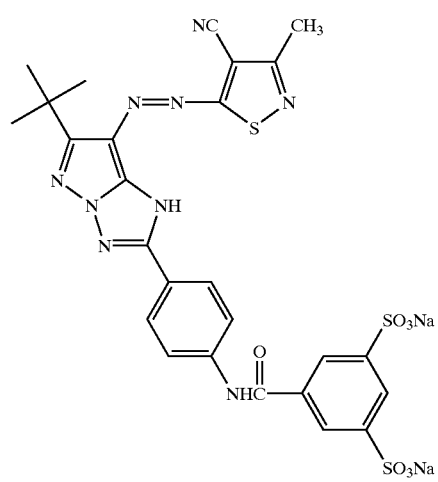
2-2
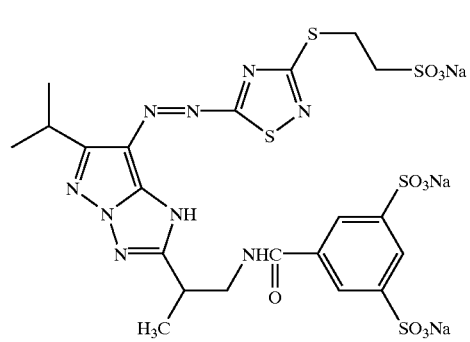
2-3
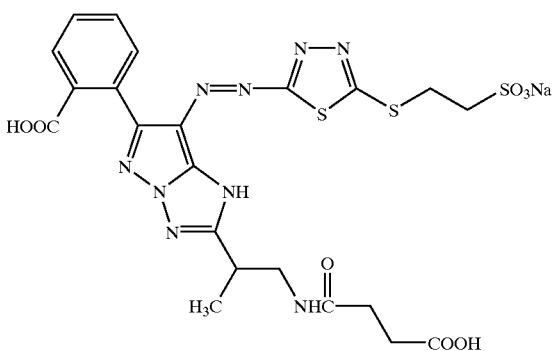
2-4
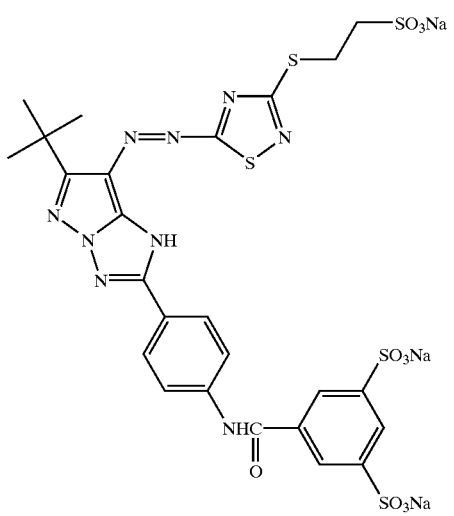
2-5
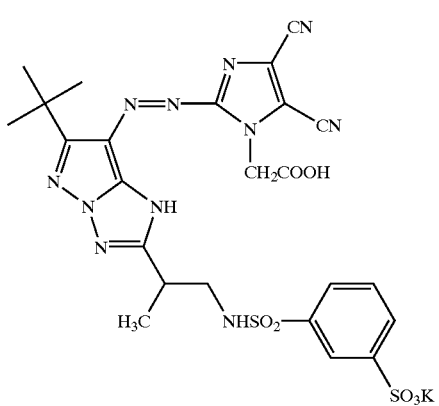

2-6 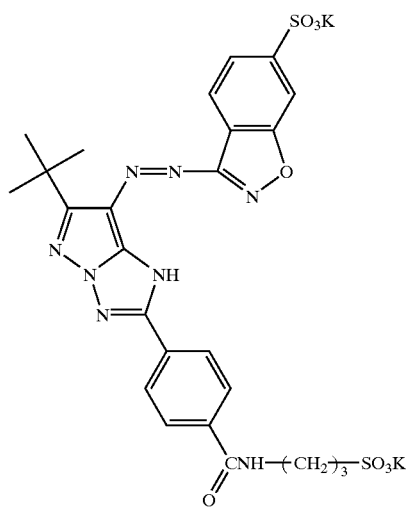
2-7 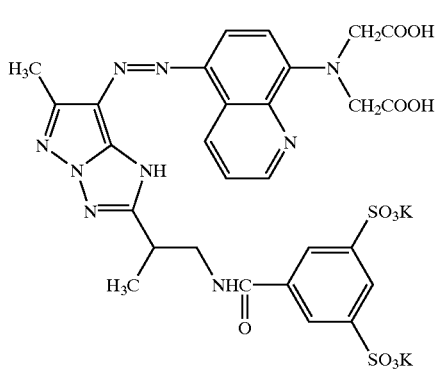
2-8 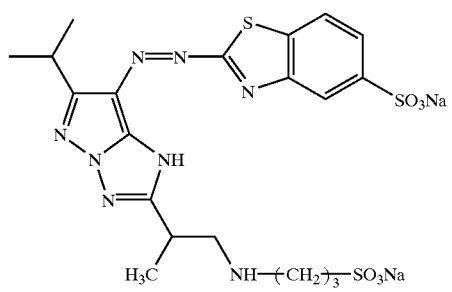
2-9 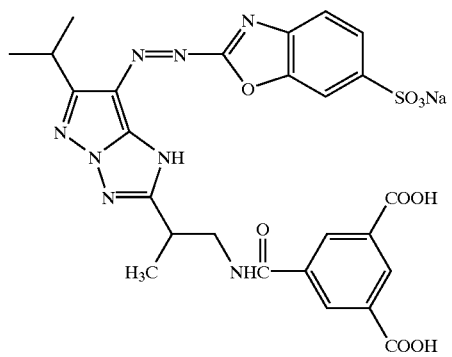
2-10 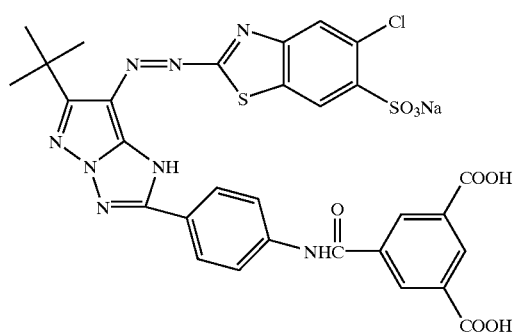
2-11 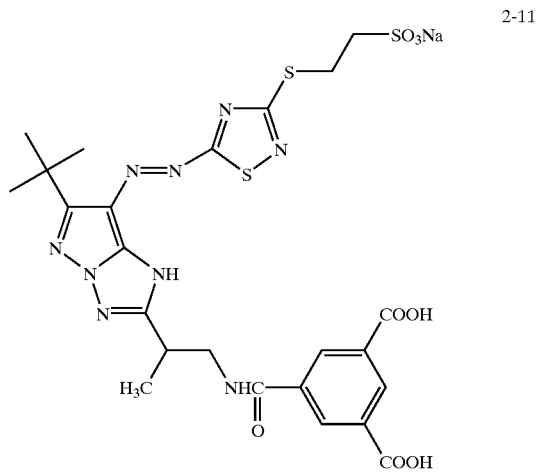
2-12 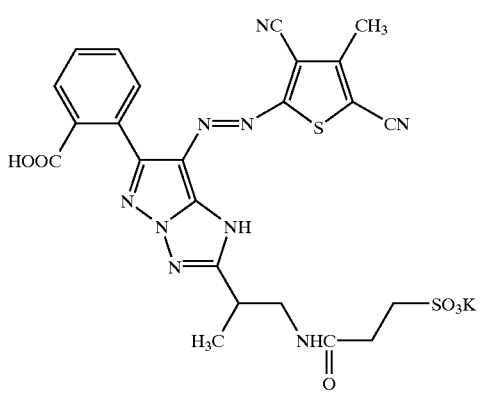
2-13 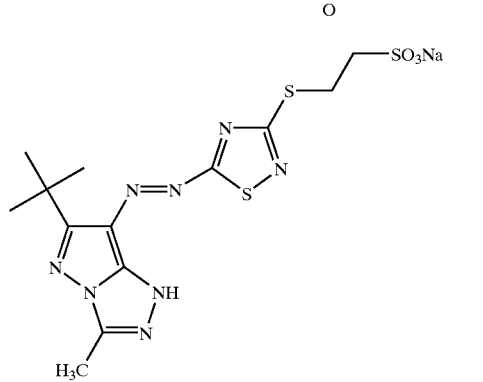

-continued
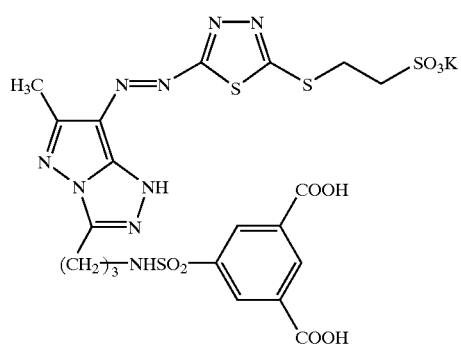
2-14
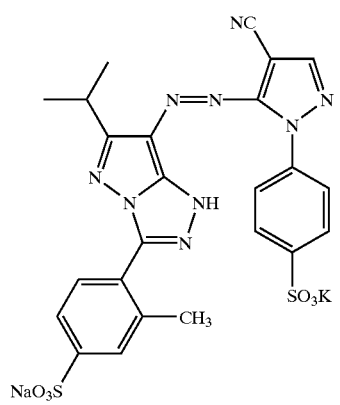
2-15
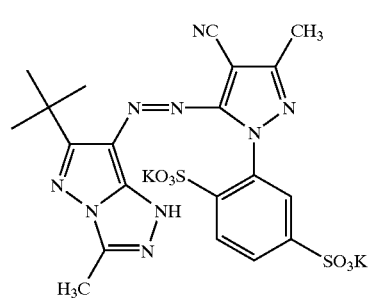
2-16
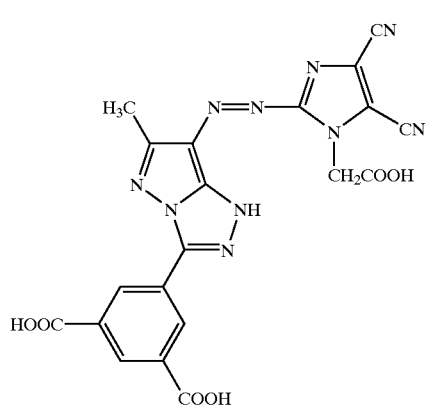
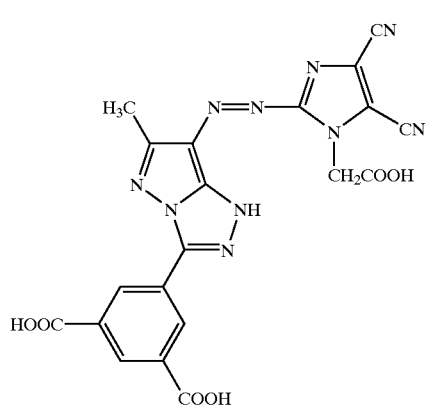
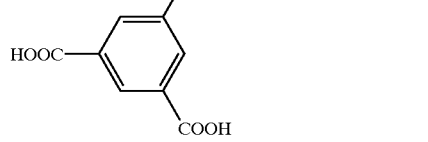
2-17
-continued
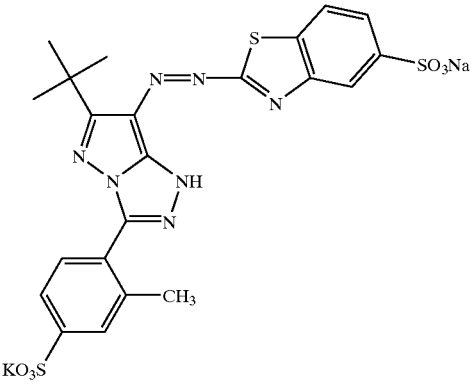
2-18
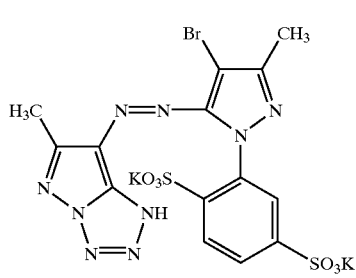
2-19
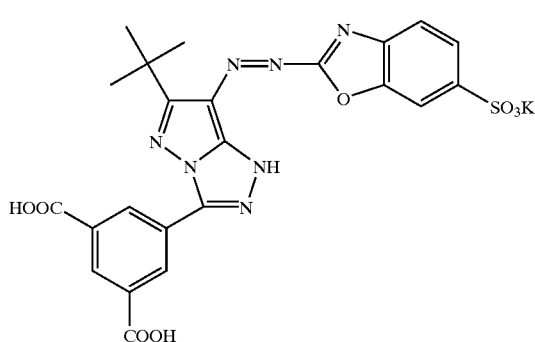
2-20
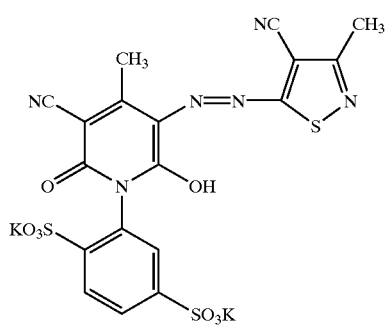
3-1
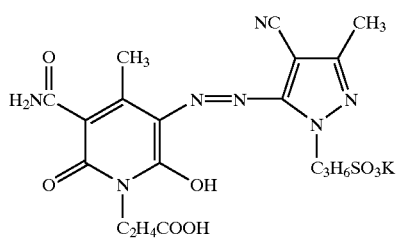
3-2

-continued
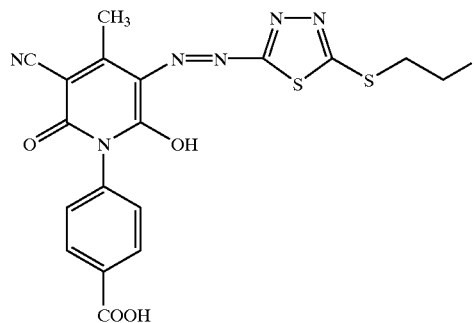
3-3
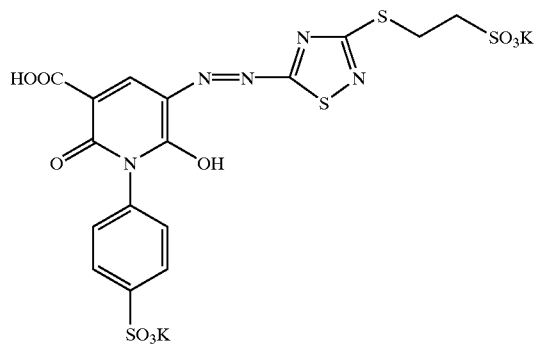
3-4
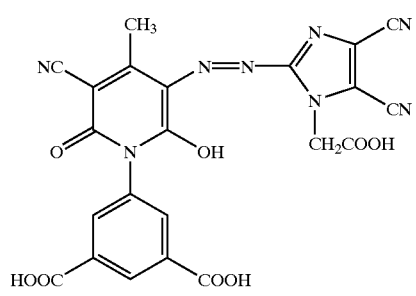
3-5
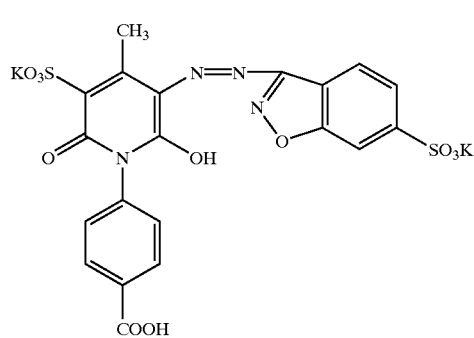
3-6
3-7
-continued
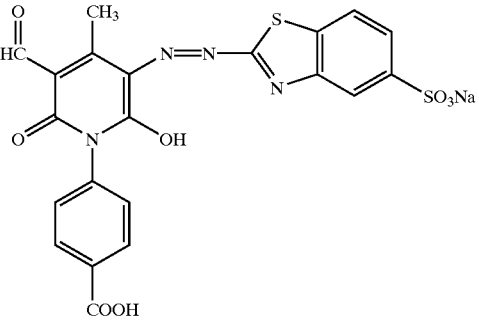
3-8
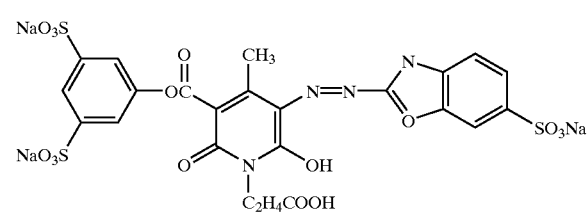
3-9
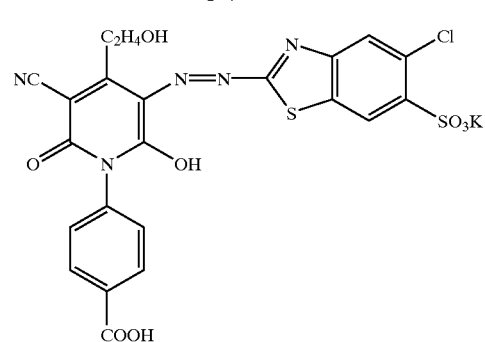
3-10
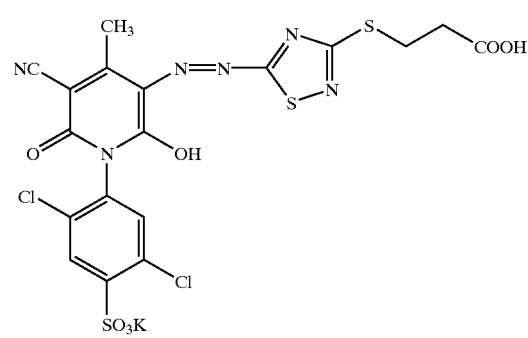
3-11
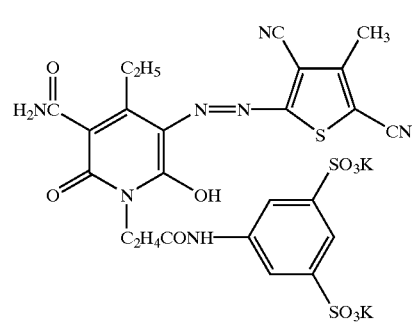
3-12
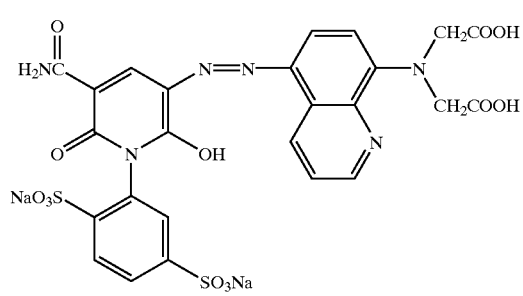
The water-soluble dyes represented by the formulae (1) to (3) may be synthesized by the coupling reaction between a diazo component and a coupler component. The water-soluble dyes may be synthesized by the process described in Japanese Patent Application No. 15614/2001.

The water-soluble dyes represented by the formulae (1) to (3) (hereinafter also referred to merely as "water-soluble dyes") are contained in an amount of preferably 0.2 part by weight to 20 parts by weight per 100 parts by weight of the ink jet recording ink of the invention. The ink jet ink of the invention may further contain other dyes for obtaining a full-color image or adjusting color tone together with the water-soluble dyes. As examples of the dyes to be used together with the water-soluble dyes, there amay be illustrated the following.

Yellow dyes include aryl or heteryl azo dyes containing, for example, a phenol, a naphthol, an aniline, a pyrazolone, a pyridone or an open-chain active methylene compound as a coupling component; azomethine dyes containing, for example, an open-chain active methylene compound as a coupling component; methine dyes such as benzylidene dyes and monomethine oxonol dyes; and quinone dyes such as naphthoquinone dyes and anthraquinone dyes. As other kinds of dyes, there may be illustrated quinophthalone dyes, nitro-nitroso dyes, acridine dyes and acridinone dyes. These dyes may be of the type which assume a yellow color only when part of the chromophore is dissociated. The counter cation of such type dyes may be an inorganic cation such as an alkali metal or ammonium or may be an organic cation such as pyridinium or a quaternary ammonium salt or, further, may be a polymer cation having such ions in the partial structure thereof.

Magenta dyes include aryl or heteryl azo dyes containing, for example, a phenol, a naphthol or an aniline as a coupling component; azomethine dyes containing, for example, a pyrazolone or a pyrazolotriazole as a coupling component; methine dyes such as arylidene dyes, styryl dyes, merocyanin dyes and oxonol dyes; carbonium dyes such as diphenylmethane dyes, triphenylmethane dyes and xanthene dyes; quinone dyes such as naphthoquinone dyes, anthraquinone dyes and anthrapyridone dyes; and condensed polycyclic dyes such as dioxane dyes. These dyes may be of the type which assume a magenta color only when part of the chromophore is dissociated. The counter cation of such type dyes may be an inorganic cation such as an alkali metal or ammonium or may be an organic cation such as pyridinium or a quaternary ammonium salt or, further, maybe a polymer cation having such ions in the partial structure thereof.

Cyan dyes include azomethine dyes such as indoaniline dyes and indophenol dyes; polymethine dyes such as cyanin dyes, oxonol dyes and merocyanine dyes; carbonium dyes such as diphenylmethane dyes, triphenylmethane dyes and xanthene dyes; phthalocyanine dyes; anthraquinone dyes; aryl or heteryl azo dyes containing, for example, a phenol, a naphthol or an aniline as a coupling component; and indigo-thioindigo dyes. These dyes may be of the type which assume a cyan color only when part of the chromophore is dissociated. The counter cation of such type dyes may be an inorganic cation such as an alkali metal or ammonium or may be an organic cation such as pyridinium or a quaternary ammonium salt or, further, may be a polymer cation having such ions in the partial structure thereof.

In addition, black dyes such as polyazo dyes may also be used.

Next, the nonionic surfactants represented by the above formulae (I) to (III) are described below.

First, the nonionic surfactants represented by the formula (I) are described.

In the formula (I), $R_1$ represents an optionally substituted alkyl group containing 5 to 40, preferably 8 to 18, carbon atoms and may be straight or branched.

Examples of substituent groups for the alkyl group represented by $R_1$ include an aryl group (e.g., phenyl, o-tolyl, p-tolyl or p-t-butylphenyl), an alkoxy group (e.g., methoxy, ethoxy or n-butoxy) and a halogen atom (e.g., a chlorine atom or a bromine atom).

Specific examples of the alkyl group represented by $R_1$ include n-pentyl, n-hexyl, n-octyl, n-decyl, n-dodecyl, n-pentadecyl, n-octadecyl, 2-ethylhexyl, 1-ethylpentyl, 1-n-butylpentyl, 1-n-pentylhexyl, 1-n-hexylbutyl, 1-n-heptyloxtyl, 1-n-octylnonyl, 6-methoxyhexyl and 2-phenylethyl.

$m^1$ represents an average mol number of added ethylene oxide of 2 to 40, preferably 3 to 30, particularly preferably 3 to 20.

Of the nonionic surfactants in the invention represented by the formula (I), those nonionic surfactants which are represented by the following formula (I-1) are particularly preferred:

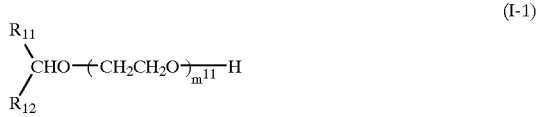
(I-1)

In the formula (I-1), $R_{11}$ and $R_{12}$ each represent a saturated hydrocarbon containing 4 to 10 carbon atoms, with the sum of $R_{11}$ and $R_{12}$ being 8 to 18, and $m^{11}$ represents a number of 3 to 20. Examples of the saturated hydrocarbon represented by $R_{11}$ and $R_{12}$ and containing 4 to 10 carbon atoms include n-butyl, i-butyl, n-pentyl, n-hexyl, n-heptyl, n-octyl, 2-ethylhexyl, n-nonyl and n-decyl. Sum of $R_{11}$ and $R_{12}$ is 8 to 18, more preferably 8 to 16. $m^{11}$ is 3 to 20, more preferably 5 to 20, still more preferably 6 to 18.

Specific examples of the compound represented by the formula (I-1) are illustrated below which, however, are not limitative at all:

W1-1,2

W1-1: $m^1$ = 5
W1-2: $m^1$ = 10

W1-3,4

W1-3: $m^1$ = 10
W1-4: $m^1$ = 15

W1-5~7

W1-5: $m^1$ = 10
W1-6: $m^1$ = 15
W1-7: $m^1$ = 20

W1-8

W1-9

W1-10,11

W1-10: $m^1$ = 12
W1-11: $m^1$ = 25

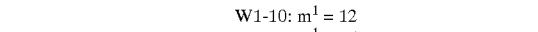

W1-12

TABLE 1

| No. | $R^{11}$ | $R^{12}$ | $m^{11}$ |
|---|---|---|---|
| W1-13 | (n)$C_4H_9$ | (n)$C_4H_9$ | 3 |
| W1-14 | (i)$C_4H_9$ | (i)$C_4H_9$ | 5 |
| W1-15 | (i)$C_4H_9$ | (i)$C_4H_9$ | 9.5 |
| W1-16 | (i)$C_4H_9$ | (i)$C_4H_9$ | 11.4 |
| W1-17 | (n)$C_5H_{11}$ | (n)$C_5H_{11}$ | 8 |
| W1-18 | (n)$C_5H_{11}$ | (n)$C_5H_{11}$ | 10 |
| W1-19 | (n)$C_5H_{11}$ | (n)$C_5H_{11}$ | 11.4 |
| W1-20 | (n)$C_5H_{11}$ | (n)$C_5H_{11}$ | 13.5 |
| W1-21 | (n)$C_5H_{11}$ | (n)$C_6H_{13}$ | 15 |
| W1-22 | (n)$C_6H_{13}$ | (n)$C_6H_{13}$ | 10 |
| W1-23 | (n)$C_6H_{13}$ | (n)$C_6H_{13}$ | 13.6 |
| W1-24 | (n)$C_6H_{13}$ | (n)$C_6H_{13}$ | 15.8 |
| W1-25 | (n)$C_6H_{13}$ | (n)$C_7H_{15}$ | 16 |
| W1-26 | (n)$C_7H_{15}$ | (n)$C_7H_{15}$ | 15 |
| W1-27 | (n)$C_7H_{16}$ | (n)$C_7H_{15}$ | 16.5 |
| W1-28 | (n)$C_8H_{17}$ | (n)$C_8H_{17}$ | 14 |
| W1-29 | (n)$C_8H_{17}$ | (n)$C_8H_{17}$ | 17.6 |
| W1-30 | (n)$C_8H_{17}$ | (n)$C_{10}H_{21}$ | 20 |

Next, the nonionic compounds represented by the formula (II) are described below.

In the formula (II), $R_2$ represents an optionally substituted alkyl group containing 5 to 40, preferably 5 to 30, carbon atoms, and may be straight or branched. Examples of substituent groups for the alkyl group represented by $R_2$ include an aryl group (e.g., phenyl, o-tolyl, p-tolyl or p-t-butylphenyl), an alkoxy group (e.g., methoxy, ethoxy or n-butoxy) and a halogen atom (e.g., a chlorine atom or a bromine atom). Specific examples of the alkyl group represented by $R_2$ include n-pentyl, n-hexyl, n-octyl, n-decyl, n-dodecyl, n-pentadecyl, n-octadecyl, 2-ethylhexyl, 1-ethylpentyl, 1-n-butylheptyl, 1-n-hexylnonyl, 1-n-heptyldecyl, 1-n-octyldodecyl, 1-n-decyltetradecyl, 6-methoxyhexyl and 1-phenylethyl.

$m^2$ represents an average mol number of added ethylene oxide of 2 to 40, preferably 3 to 30, particularly preferably 4 to 20.

Of the nonionic surfactants in the invention represented by the formula (II), those nonionic surfactants which are represented by the following formula (II-1) are particularly preferred:

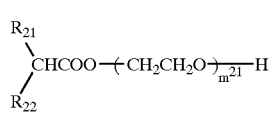

(II-1)

In the formula (II-1), $R_{21}$ and $R_{22}$ each independently represent a saturated hydrocarbon containing 2 to 20 carbon atoms, preferably 4 to 13 carbon atoms. Examples of the saturated hydrocarbon represented by $R_{21}$ and $R_{22}$ and containing 2 to 20 carbon atoms include ethyl, n-butyl, i-butyl, n-pentyl, n-hexyl, n-heptyl, n-octyl, 2-ethylhexyl, n-nonyl, n-decyl, n-dodecyl, n-hexadecyl and n-octadecyl. $m^{21}$ represents an average mol number of added ethylene oxide of 2 to 40, more preferably 3 to 30.

Specific examples of the compound represented by the formula (II-1) are illustrated below which, however, are not limitative at all.

(n)$C_7H_{15}COO$—(—$CH_2CH_2O$—)$_{m^2}$—H   W2-1,2

W2-1: $m^2 = 10$
  W2-2: $m^2 = 15$ (n)$C_{11}H_{23}COO$—(—$CH_2CH_2O$—)$_{m^2}$—H   W2-3~5

W2-3: $m^2 = 10$
  W2-4: $m^2 = 15$
  W2-5: $m^2 = 20$ (n)$C_{13}H_{27}COO$—(—$CH_2CH_2O$—)$_{m^2}$—H   W2-6~7

W2-6: $m^2 = 10$
  W2-7: $m^2 = 15$ (n)$C_{15}H_{31}COO$—(—$CH_2CH_2O$—)$_{m^2}$—H   W2-8,9

W2-8: $m^2 = 10$
  W2-9: $m^2 = 15$ $C_{17}H_{31}COO$—(—$CH_2CH_2O$—)$_{20}$—H   W2-10

$C_{17}H_{33}COO$—(—$CH_2CH_2O$—)$_{20}$—H   W2-11

$C_{17}H_{35}COO$—(—$CH_2CH_2O$—)$_{15}$—H   W2-12

TABLE 2

| No. | $R^{21}$ | $R^{22}$ | $m^{21}$ |
|---|---|---|---|
| W2-13 | $C_2H_5$ | $C_4H_9$ | 3 |
| W2-14 | $C_2H_5$ | $C_4H_9$ | 5 |
| W2-15 | $C_4H_9$ | $C_6H_{13}$ | 9.5 |
| W2-16 | $C_6H_{13}$ | $C_8H_{17}$ | 5 |
| W2-17 | $C_6H_{13}$ | $C_8H_{17}$ | 8 |
| W2-18 | $C_6H_{13}$ | $C_8H_{17}$ | 10 |
| W2-19 | $C_6H_{13}$ | $C_8H_{17}$ | 11.4 |
| W2-20 | $C_6H_{13}$ | $C_8H_{17}$ | 12.5 |
| W2-21 | $C_6H_{13}$ | $C_8H_{17}$ | 15 |
| W2-22 | $C_6H_{13}$ | $C_8H_{17}$ | 25 |
| W2-23 | $C_7H_{15}$ | $C_9H_{19}$ | 14 |
| W2-24 | $C_7H_{15}$ | $C_9H_{19}$ | 15 |
| W2-25 | $C_7H_{15}$ | $C_9H_{19}$ | 20 |
| W2-26 | $C_7H_{15}$ | $C_9H_{19}$ | 25 |
| W2-27 | $C_8H_{17}$ | $C_{10}H_{21}$ | 30 |
| W2-28 | $C_{10}H_{21}$ | $C_{12}H_{25}$ | 20 |
| W2-29 | $C_{10}H_{21}$ | $C_{12}H_{25}$ | 25 |
| W2-30 | $C_{10}H_{21}$ | $C_{13}H_{27}$ | 20 |
| W2-31 | $C_{10}H_{21}$ | $C_{13}H_{27}$ | 25 |
| W2-32 | $C_{10}H_{21}$ | $C_{13}H_{27}$ | 40 |

Next, the nonionic compounds represented by the formula (III) are described below.

In the formula (III), $R_1$ and $R_2$ each independently represents an alkyl group containing 1 to 18 carbon atoms.

To describe more specifically, $R_1$ and $R_2$ each independently represent an alkyl group containing 1 to 18 carbon atoms (e.g., methyl, ethyl, n-propyl, butyl, hexyl, octyl, decyl or dodecyl) and may be substituted. Examples of substituents include an alkyl group (e.g., methyl, ethyl or propyl), an alkoxy group (e.g., methoxy or ethoxy) and a halogen atom (e.g., a chlorine atom or a bromine atom). Of these, unsubstituted straight alkyl groups or unsubstituted branched alkyl groups containing 1 to 12 carbon atoms are preferred as $R_1$ and $R_2$. Particularly preferred specific examples thereof include methyl, ethyl, n-butyl, 2-methylbutyl and 2,4-dimethylpentyl.

$R_3$ represents a hydrogen atom, an alkyl group containing 1 to 6 carbon atoms or a phenyl group, with the alkyl group and the phenyl group being optionally substituted.

Substituents for $R_3$ include an alkyl group (e.g., methyl, ethyl or isopropyl), an alkoxy group (e.g., methoxy or ethoxy) and a phenyl group. As substituents for the phenyl group represented by $R_3$, there are illustrated an alkyl group (e.g., methyl, ethyl, isopropyl), an alkoxy group (e.g., methoxy or ethoxy) and a halogen atom (e.g., a fluorine atom, a chlorine atom or a bromine atom). Of $R_3$, a hydrogen atom and an alkyl group containing 1 to 4 carbon atoms are preferred, with the hydrogen atom being particularly preferred.

X represents a hydrogen atom or

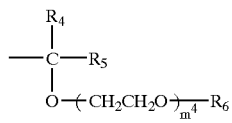

wherein $R_4$ and $R_5$ each independently represents an alkyl group containing 1 to 18 carbon atoms. Preferred substituents or specific examples thereof for $R_4$ and $R_5$ include those substituents and specific examples which are selected from the same group as with $R_1$ and $R_2$ described above. $R_6$ represents a hydrogen atom, an alkyl group containing 1 to 6 carbon atoms or a phenyl group, and preferred examples thereof include those substituents or specific examples which are selected from the same group as with $R_3$ described above.

$m^3$ and $m^4$ each represent an average mol number of added ethylene oxide, with $m^3+m^4$ being 0 to 100, preferably 0 to 50, particularly preferably 0 to 40.

Here, when $m^3=0$, R represents a hydrogen atom and, when $m^4=0$, $R_6$ represents a hydrogen atom. Also, when X represents a hydrogen atom, $m^3$ represents 1 to 100, preferably 1 to 50, particularly preferably 1 to 40.

Specific examples of the nonionic surfactants represented by the formula (III) are illustrated below which, however, are not limitative at all:

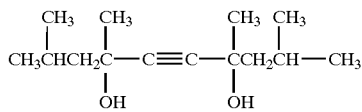

W5-1

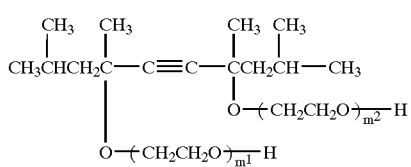

W5-2~6

W5-2: $m^1 + m^2 = 1.3$
W5-3: $m^1 + m^2 = 3.5$
W5-4: $m^1 + m^2 = 10$
W5-5: $m^1 + m^2 = 20$
W5-6: $m^1 + m^2 = 30$

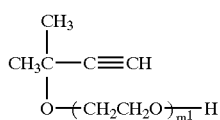

W5-7,8

W5-7: $m^1 = 5$
W5-8: $m^1 = 10$

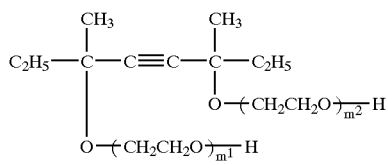

W5-9,10

W5-9: $m^1 + m^2 = 3$
W5-10: $m^1 + m^2 = 10$

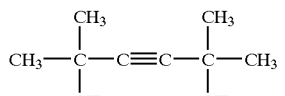

W5-11

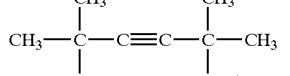

W5-12

$m^2 = 3$

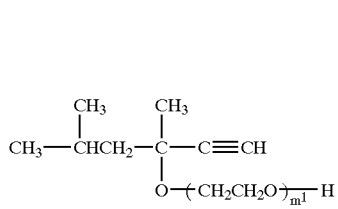

W5-13,14

W5-13: $m^1 = 5$
W5-14: $m^1 = 10$

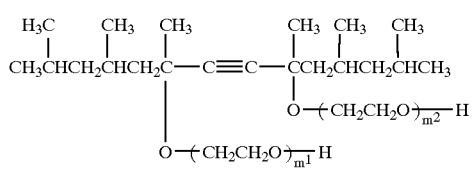

W5-15,16

W5-15: $m^1 + m^2 = 8$
W5-16: $m^1 + m^2 = 20$

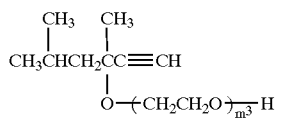

W5-17,18

W5-17: $m^3 = 5$
W5-18: $m^3 = 10$

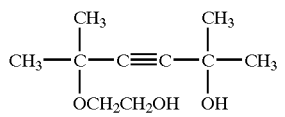

W5-19

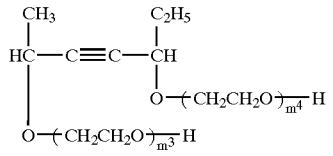

W5-20

$m^3 + m^4 = 2$

The compounds of the invention represented by the formula (III) may be easily available as markettred products, and specific trade names thereof include Surfynol 61, 82, 104, 420, 440, 465, 485, 504, CT-111, CT-121, CT-131, CT-136, CT-141, CT-151, CT-171, CT-324, DF-37, DF-58, DF-75, DF-110D, DF-210, GA, OP-340, PSA-204, PSA-216, PSA-336, SE, SE-F, Dynol 604 (these being products of Nissin Chemical Industry, K.K. or Air Products and Chemicals, Inc.) and Olfin A, B, AK-02, CT-151W, E1004, E1010, P, SPC, STG, Y and 32W (these being products of Nissin Chemical Industry K.K.).

The nonionic surfactants of the invention represented by the formulae (I) to (III) may be synthesized according to known processes. For example, they may be obtained according to the processes described in completely revised "Shin Kaimen Kasseizai Nyumon" written by Takehiko Fujimoto (1992), pp.94 to 107. Also, in the invention, the nonionic surfactants represented by the formulae (I) to (III) may be used alone or in combination of two or more of them.

The content of surfactants including the nonionic surfactants of the invention represented by the formulae (I) to (III) is 0.001 to 15% by weight, preferably 0.005 to 10% by weight, more preferably 0.01 to 5% by weight, based on the ink composition.

The ink composition of the invention may be prepared by dissolving and/or dispersing the dye and the surfactant in an aqueous medium. The aqueous medium may be prepared by adding, as needed, additives to be described hereinafter in proper amounts to water or a mixture of water and a small amount of a water-miscible organic solvent.

Examples of the water-miscible organic solvent to be used in the invention include an alcohol (e.g., methanol, ethanol, propanol, isopropanol, butanol, isobutanol, sec-butanol, t-butanol, pentanol, hexanol, cyclohexanol or benzyl alcohol), a polyhydric alcohol (e.g., ethylene glycol, diethylene glycol, triethylene glycol, polyethylene glycol, propylene glycol, dipropylene glycol, polypropylene glycol, butylene glycol, hexanediol, pentanediol, glycerin, hexanetriol or thiodiglycol), a glycol derivative (e.g., ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether or ethylene glycol monophenyl ether), anamine (e.g., ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethyleneimine or tetramethylpropylenediamine) and other polar solvents (e.g., formamide, N,N-dimethylformamide, N,N-dimethylacetamide, dimethylsulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile and acetone).

Additionally, the above-described water-miscible organic solvents may be use in combination of two or more of them.

The above-described water-soluble organic solvents are used in an amount of preferably from 0.1% by weight to 50% by weight, more preferably from 1% by weight to 50% by weight, based on the ink composition.

In the case of using the ink composition of the invention as an ink for ink jet recording, additives such as anti-drying agents for preventing clogging at ink nozzles due to drying of the ink, penetration accelerators for more effectively penetrating the ink into paper, UV ray absorbents, anti-oxidants, viscosity-adjusting agents, surface tension-adjusting agents, dispersants, dispersion stabilizers, antifungal agents, rust inhibitors, pH-adjusting agents, defoaming agents and chelating agents may properly be selected and added in suitable amounts.

As the anti-drying agents to be used in the invention, those water-soluble organic solvents are preferred which have a lower vapor pressure than that of water. Specific examples thereof include polyhydric alcohols represented by ethylene glycol, propylene glycol, diethylene glycol, polyethylene glycol, thiodiglycol, dithiodiglycol, 2-methyl-1,3-propanediol, 1,2,6-hexanetriol, acetylene glycol derivative, glycerin and trimethylolpropane; lower alkyl ethers of polyhydric alcohols such as ethylene glycol monomethyl (or ethyl) ether, diethylene glycol monomethyl (or ethyl) ehter and triethylene glycol monoethyl(or butyl) ether; heterocyclic compounds such as 2-pyrrolidone, N-methyl-2-pyrrolidone, 1,3-dimethyl-2-imidazolidinone and N-ethylmorpholine; sulfur-containing compounds such as sulfolane, dimethylsulfoxide and 3-sulfolene; polyfunctional compounds such as diacetone alcohol and diethanolamine; and urea derivatives. Of these, polyhydric alcohols such as glycerin and diethylene glycol are more preferred. In addition, these anti-drying agents may be used independently or in combination of two or more of them.

These anti-drying agents are contained in the ink in an amount of preferably from 1.0% by weight to 50% by weight.

As the penetration-accelerating agents to be used in the invention, there may be used alcohols such as ethanol, isopropanol, butanol, di(tri)ethylene glycol monobutyl ether and 1,2-hexanediol, sodium laurylsulfate, sodium oleate and nonionic surfactants. These can exhibit sufficient effects when contained in an amount of 10% by weight in the ink and are preferably used within the range of amounts not causing blurring of printed image and print-through.

As the UV ray absorbents to be used in the invention for improving preservability of formed images, there may be used benzotriazole compounds described in Japanese Patent Laid-Open Nos. 185677/1983, 190537/1986, 782/1990, 197075/1993 and 34057/1997, benzophenone compounds described in Japanese Patent Laid-Open Nos. 2784/1971 and 194483/1993, and U.S. Pat. No. 3,214,463, cinnamic acid compounds described in Japanese Patent Publication Nos. 30492/1973 and 21141/1981, and Japanese Patene Laid-Open No. 88106/1998, triazine compounds described in Japanese Patent Laid-Open Nos. 298503/1992, 53427/1996, 239368/1996 and 182621/1998, and International Patent Publication No. 501291/1996, compounds described in Research Disclosure No. 24239, and so-called fluorescent brightening agents which absorb UV rays to emit fluorescence and are represented by stilbene compounds and benzoxazole compounds.

As the anti-oxidants to be used in the invention for improving preservability of formed images, there may be used various organic and metal complex anti-fading agents. Examples of the organic anti-fading agents include hydroquinones, alkoxyphenols, dialkoxyphenols, phenols, anilines, amines, indanes, chromans, alkoxyanilines and heterocyclic compounds, and the metal complex anti-fading agents include nickel complexes and zinc complexes. More specifically, compounds described in the patents cited in Research Disclosure No. 17643, VII, items I to J, ibid., No. 15162, ibid., No. 18716, p.650, left column, ibid., No. 36544, p.527, ibid., No. 30105, p.872, and ibid., No. 15162, and those compounds which are included by the formula of representative compounds and compound examples described in Japanese Patent Laid-Open No. 215272/1987, p.127 to 137 may be used.

As the antifungal agents to be used in the invention, there are illustrated sodium dehydroacetate, sodium benzoate, sodium pyridinethione-1-oxide, ethyl p-hydroxybenzoate, 1,2-benzisothiazolin-3-one, and salts thereof. These are used in the ink preferably in an amount of 0.02 to 5.00% by weight Additionally, detailed descriptions on these compounds are given in "Bokin Bokabi-zai Jiten" (compiled by Nihon Bokin Bokabi Gakkai Jiten Henshu Iinkai).

Also, as the runst inhibitors, there are illustrated, for example, acid sulfites, sodium thiosulfate, ammonium thioglycollate, diisopropylammonium nitrite, pentaerythritol tetranitrate, dicyclohexylammonium nitrite and benzotriazole. These are used in the ink preferably in an amount of 0.02 to 5.00% by weight.

Further, in the invention, a dispersion of polymer fine particles may be used for the purpose of improving image preservability and surface luster. Detailed descriptions thereon are given in Japanese Patent Application No. 299465/2000. In the case of using the dispersion of polymer fine particles in the invention, the particles have an average particle size of preferably up to 1 um, and the solid content of the dispersion of polymer fine particles is preferably from 0.05% by weight to 30% by weight.

The pH-adjusting agents to be used in the invention may preferably be used in respect of adjusting pH and imparting dispersion stability and are added in an enough amount to adjust the pH to preferably 4.5 to 10.0, more preferably 6 to 10.0.

As the pH-adjusting agents, there are illustrated organic bases and inorganic alkalis as basic agents, and organic acids and inorganic acids as acidic agents.

The organic bases include triethanolamine, diethanolamine, N-methyldiethanolamine and dimethylethanolamine. The inorganic alkalis include hydroxides of alkali metals (e.g., sodium hydjroxide, lithium hydroxide and potassium hydroxide), carbonates (e.g., sodium carbonate and sodium hydrogencarbonate) and ammonia.

The organic acids include acetic acid, propionic acid, trifluoroacetic acid and alkylsulfonic acid. The inorganic acids include hydrochloric acid, sulfuric acid and phosphoric acid.

In the invention, as the surface tension-adjusting agents, there are illustrated nonionic, cationic or amphoteric surfactants in addition to the aforesaid surfactants.

For example, the anionic surfactants include fatty acid salts, alkylsulfates, alkylbenzenesulfonates, alkylnaphthalenesulfonates, dialkylsulfosuccinates, alkylphosphates, naphthalenesulfonic acid-formalin condensate and polyoxyethylene alkylsulfates, the nonionic surfactants include polyoxyethylene alkyl ethers, polyoxyethylene alkylaryl ethers, polyoxyethylene fatty acid esters, sorbitan fatty acid esters, polyoxyethylene ssorbitan fatty acid esters, polyoxyethylene alkylamines, glycerin fatty acid esters and oxyethylene-oxypropylene block copolymers. Acetylenic polyoxyethylene oxide surfactats, SURFYNOLS (Air Products & Chemicals, Inc.), are also preferably usable. In addition, amine oxide type amphoteric surfactants such as N,N-dimethyl-N-alkylamine oxides. Further, surfactants described in Japanese Patent Laid-Open No. 157,636/1984, pp.37 to 38, and Research Disclosure No. 308119 (1989) may also be used.

The ink of the invention using or not using these surfactants has a surface tension of preferably 20 mN/m to 60 mN/m, more preferably 25 mN/m to 45 mN/m.

The ink of the invention has a viscosity of preferably 30 mPa·s or less. It is more preferred to adjust the viscosity to 20 mPa·s or less, and hence a viscosity-adjusting agent is in some cases used for the purpose of adjusting the viscosity. As the viscosity adjusting agent, there are illustrated, for example, water-soluble polymers such as celluloses and polyvinyl alcohol, and nonionic surfactants. More detailed descriptions are given in "Nendo Chosei Gijutsu" (Gijutu Joho Kyokai, 1999), chapter 9, and "Ink Jet Printer Yo Chemicals (enlarged in year 1998)-Zairyo no Kaihatsu Doko.Tenbo Chosa-" (published by C.M.C. in 1997), pp.162 to 174.

Also, in the invention, the above-described cationic, anionic or nonionic various surfactants may be used as dispersion-stabilizing agents, and fluorine-containing compounds, silicone compounds and chelating agents represented by EDTA may be used as defoaming agents, as the case demands.

The ink of the invention can be used for forming images on known recording media, i.e., plain paper, resin-coated paper, ink jet recording paper described in, for example, Japanese Patent Laid-Open Nos. 169172/1996, 27693/1996, 276670/1990, 276789/1995, 323475/1997, 238783/1987, 153989/1998, 217473/1998, 235995/1998, 337947/1998, 217597/1998 and 337947/1998, film, paper commonly usable for both ink jet recording and electrophotographic recording, cloth, glass, metal and ceramics.

Recording paper and recording film to be used for conducting ink jet printing using the ink composition of the invention are described below. A support in the recording paper and the recording film comprises chemical pulp such as LBKP or NBKP, mechanical pulp such as GP, PGW, RMP, TMP, CTMP, CMP or CGP, or used paper pulp such as DIP, and is produced by mixing the pulp with, if necessary, conventionally known additives such as pigments, binders, sizing agents, fixing agents, cationic agents and paper strength-increasing agents, and subjecting to various apparatuses such as a Fourdrinier paper machine or a cylinder paper machine. In addition to these supports, synthetic papers and plastic film sheets may also be usable. The thickness of the support is preferably 10 $\mu$m to 250 $\mu$m, and the basis weight thereof is preferably 10 g/m$^2$ to 250 g/m$^2$.

On the support may directly be provided an ink-receptive layer and a back coating layer, or the ink-receptive layer and the back coating layer may be provided after size pressing with polyvinyl alcohol or the like or after forming an anchor coating layer. Further, the support may be subjected to smoothening treatment using a calender apparatus such as a machine calender, a TG calender or a soft calender. In the invention, paper laminated on both sides thereof with a polyolefin (e.g., polyethylene, polystyrene, polyethylene terephthalate, polybutene or the copolymer thereof) and plastic film are preferably used. It is preferred to add a white pigment (e.g., titanium oxide or zinc oxide) or a coloring dye (e.g., cobalt blue, ultramarine or neodymium oxide).

The ink-receptive layer to be provided on the support contains a pigment or a aqueous binder. As the pigment, a white pigment is preferred. The white pigment includes inorganic white pigments such as calcium carbonate, kaolin, talc, clay, diatomaceous earth, synthetic amorphous silica, aluminum silicate, magnesium silicate, calcium silicate, aluminum hydroxide, alumina, lithopone, zeolite, barium sulfate, calcium sulfate, titanium dioxide, zinc sulfide and zinc carbonate and organic pigments such as styrenic pigments, acrylic pigments, urea resin and melamine resin.

As the white pigment to be contained in the ink-receptive layer, porous inorganic pigments are preferred, with synthetic amorphous silica having a large pore area being particularly preferred. As the synthetic amorphous silica, either of anhydrous silicic acid obtained by a dry process and silicic acid hydrate obtained by a wet process can be used, with silicic acid hydrate being particularly preferred. These pigments may be used in combination of two or more of them.

The aqueous binder to be contained in the ink-receptive layer includes water-soluble high polymers such as polyvinyl alcohol, silanol-modified polyvinyl alcohol, starch, cationized starch, casein, gelatin, carboxymethyl cellulose, hydroxyethyl cellulose, polyvinylpyrrolidone, polyalkylene oxide and polyalkylene oxide derivative, and water-dispersible high polymers such as styrene-butadiene latex and acryl emulsion. These aqueous binders may be used alone or in combination of two or more of them. In the invention, polyvinyl alcohol and silanol-modified polyvinyl alcohol are particularly preferred in view of adhesion properties to pigments and delamination resistance of the ink-receptive layer.

The ink-receptive layer may contain a mordant, a water resistance-imparting agent, a light resistance-improving agent, a surfactant, a hardener, and like additives in addition to the pigment and the aqueous binder.

The mordant to be added to the ink-receptive layer is preferably immobilized. From this point of view, polymer mordants are preferably used. Descriptions on the polymer mordants are given in Japanese Patent Laid-Open Nos. 28325/1973, 74430/1979, 124726/1979, 22766/1980, 142339/1980, 23850/1985, 23851/1985, 23852/1985, 23853/1985, 57836/1985, 60643/1985, 118843/1985, 122940/1985, 122941/1985, 122942/1985, 235134/1985 and 161236/1090, and U.S. Pat. Nos. 2,484,430, 2,548,564, 3,148,061, 3,309,690, 4,115,124, 4,124,386, 4,193,800, 4,273,853, 4,282,305 and 4,450,224. An image-receiving material containing a polymer mordant described in Japanese Patent Laid-Open No. 161236/1989, pp. 212 to 215 is particularly preferred. Use of the polymer mordants described in the publication serves to obtain an image with excellent image quality and improved light fastness.

The water resistance-imparting agent is effective for making the image water-resistant and, as such water resistance-imparting agents, cationic resins are particularly preferred. Such cationic resins include polyamidopolyamine epichlorohydrin, polyethyleneimine, polyaminesulfone, dimethyldiallylammonium chloride polymer, cationic polyacrylamide and colloidal silica. Of these cationic resins, polyamidopolyamine epichlorohydrin is particularly preferred. The content of the cationic resin is preferably from 1% by weight to 15% by weight, particularly preferably from 3% by weight to 10% by weight, based on the whole solid components of the ink-receptive layer.

The light fastness-improving agent includes zinc sulfate, zinc oxide, hindered amine type anti-oxidants and benzotriazole type UV ray absorbents. Of these, zinc sulfate is particularly preferred.

The surfactant functions as a coating aid, a delamination-preventing agent, a sliding properties-improving agent or an antistatic agent. Descriptions on the surfactant are given in Japanese Patent Laid-Open Nos. 173463/1987 and 183457/1987.

An organic fluorine-containing compound may be used in place of the surfactant. Such organic fluorine-containing compounds are preferably hydrophobic. Examples of the organic fluorine-containing compound include fluorine-containing surfactants, oily fluorine-containing compounds (e.g., fluorine-containing oil) and solid fluorine-containing compounds (e.g., tetrafluoroethylene resin). Descriptions on the organic fluorine-containing compounds are given in Japanese Patent Publication No. 9053/1982 (columns 8 to 17), 20994/1986 and 135826/1987.

As the hardener, those materials which are described in Japanese Patent Laid-Open No. 161236/1989, page 222 maybe used.

Other additives to be added to the ink-receptive layer include a pigment-dispersing agent, a thickening agent, a defoaming agent, a dye, a fluorescent brightening agent, an antiseptic, a pH-adjusting agent, a matting agent and a hardener. Additionally, the ink-receptive layer may be a single layer or a double layer.

A back coating layer may be provided on the recording paper and the recording film. Components capable of being added to this layer include a white pigment, an aqueous binder and other components. The white pigments to be contained in the back coating layer include white inorganic pigments such as light calcium carbonate, heavy calcium carbonate, kaolin, talc, calcium sulfate, barium sulfate, titanium dioxide, zinc oxide, zinc sulfide, zinc carbonate, satin white, aluminum silicate, diatomaceous earth, calcium silicate, magnesium silicate, synthetic anhydrous silica, colloidal silica, colloidal alumina, pseudo-boehmite, aluminum hydroxide, alumina, lithopone, zeolite, hydrated halloysite, magnesium carbonate and magnesium hydroxide, and organic pigments such as styrenic plastic pigments, acrylic plastic pigments, polyethylene, microcapsules, urea resin and melamine resin.

The aqueous binders to be contained in the back coating layer include water-soluble high polymers such as styrene/malic acid salt copolymer, styrene/acrylic acid copolymer, polyvinyl alcohol, silanol-modified polyvinyl alcohol, starch, cationized starch, casein, gelatin, carboxymethyl cellulose, hydroxyethyl cellulose and polyvinylpyrrolidone, and water-dispersible high polymers such as styrene-butadiene latex and acrylic emulsion.

Other components to be contained in the back coating layer include a defoaming agent, a foaming depressant, a dye, a fluorescent brightening agent, an antiseptic and a water resistance-imparting agent.

A polymer latex may be added to layers constituting the ink jet recording paper and film (including the back coating layer). The polymer latex is used for the purpose of improving physical properties of the film such as dimensional stability, curl-preventing properties, adhesion-preventing properties, and film cracking-preventing properties. Descriptions on the polymer latex are given in Japanese Patent Laid-Open No. 245258/1987, 131648/1987 and 110066/1987. Addition of a polymer latex having a low glass transition temperature (40 C or lower) to a mordant-containing layer serves to prevent cracking or curling of the layer. Also, addition of a polymer latex having a high glass transition temperature serves to prevent curling.

The ink composition of the invention is not limited as to ink jet recording method and may be used for known recording methods such as a charge-controlling method of ejecting an ink utilizing electrostatic attracting force, a drop-on-demand method utilizing vibration pressure of piezo elements (pressure pulse method), a sound ink jet method of ejecting an ink by converting electric signal to sound beam and irradiating the sound beam to the ink to utilize ejecting pressure, and a thermal ink jet (bubble jet) method by heating the ink to form a bubble and utilize the generated pressure.

The ink jet recording methods include a method of ejecting an ink having a low concentration, called photo ink, in the form of a number of ink droplets in a small volume, a method of using a plurality of inks having substantially the same hue but having different concentrations to improve image quality, and a method of using a colorless, transparent ink.

EXAMPLES

The invention is now described by reference to Examples which, however, do not limit the invention in any way.

Example 1

Deionized water was added to the following components to make 1 liter, the resultant mixture was stirred for 1 hour while heating to 30 to 40° C., Then, pH of the mixture was adjusted to 9 with a 10 mol/L KOH aqueous solution, followed by filtering the mixture under reduced pressure through a microfilter having an average pore size of 0.25 µm to prepare a yellow ink solution.

(Ink solution composition for yellow)

| | |
|---|---|
| Yellow dye (Dye No. 1-1) of the invention | 14.7 g/l |
| Diethylene glycol | 160 g/l |
| Glycerin | 150 g/l |
| Triethylene glycol monobutyl ether | 130 g/l |
| Triethanolamine | 0.8 g/l |
| Benzotriazole | 0.06 g/l |
| PROXEL XL2 | 2.5 g/l |
| Surfactant (Compound No. W1-18) | 10 g/l |

Further, a cyan ink, a light magenta ink, a magenta ink, a light cyan ink and a black ink were prepared by changing the kind of dye and additives. Thus, there was prepared an ink set 101 shown in Table 3.

TABLE 3

| | Light Magenta | Magenta | Light Cyan | Cyan | Yellow | Black |
|---|---|---|---|---|---|---|
| Dye (g/l) | A-1 | A-1 | A-2 | A-2 | 1-1 | A-5 |
|  | 7.5 | 30.0 | 8.75 | 35.0 | 14.7 | 20.0 |
|  |  |  |  |  |  | A-6 |
|  |  |  |  |  |  | 20.0 |
|  |  |  |  |  |  | A-7 |
|  |  |  |  |  |  | 20.0 |
|  |  |  |  |  |  | A-3 |
|  |  |  |  |  |  | 21.0 |
| Diethylene glycol (g/l) | 50 | 112 | 130 | 200 | 160 | 20 |
| Urea (g/l) | 37 | 46 | — | — | — | — |
| Glycerin (g/l) | 130 | 130 | 150 | 180 | 150 | 120 |
| Trienthylene glycol monobutyl ether (g/l) | 130 | 140 | 130 | 140 | 130 | — |
| 2-Pyrrolidone (g/l) | — | — | — | — | — | 230 |
| Surfactant (g/l) | — | — | — | — | — | 81 |
| Surfynol 465 (g/l) |  |  |  |  | (W1-18) 10 | — |
| Surfynol 465 (g/l) | 10 | 10 | 10 | 10 | — | — |
| Surfynol STG (g/l) | — | — | — | — | — | 8.5 |
| Triethanolamine (g/l) | 6.9 | 7.0 | 6.0 | 6.7 | 0.8 | 18.9 |
| Benzotriazole (g/l) | 0.08 | 0.07 | 0.08 | 0.08 | 0.06 | 0.06 |
| Proxel XL2 (g/l) | 3.5 | 2.5 | 1.8 | 2.0 | 2.5 | 1.8 |

Deionized water to make 1 liter

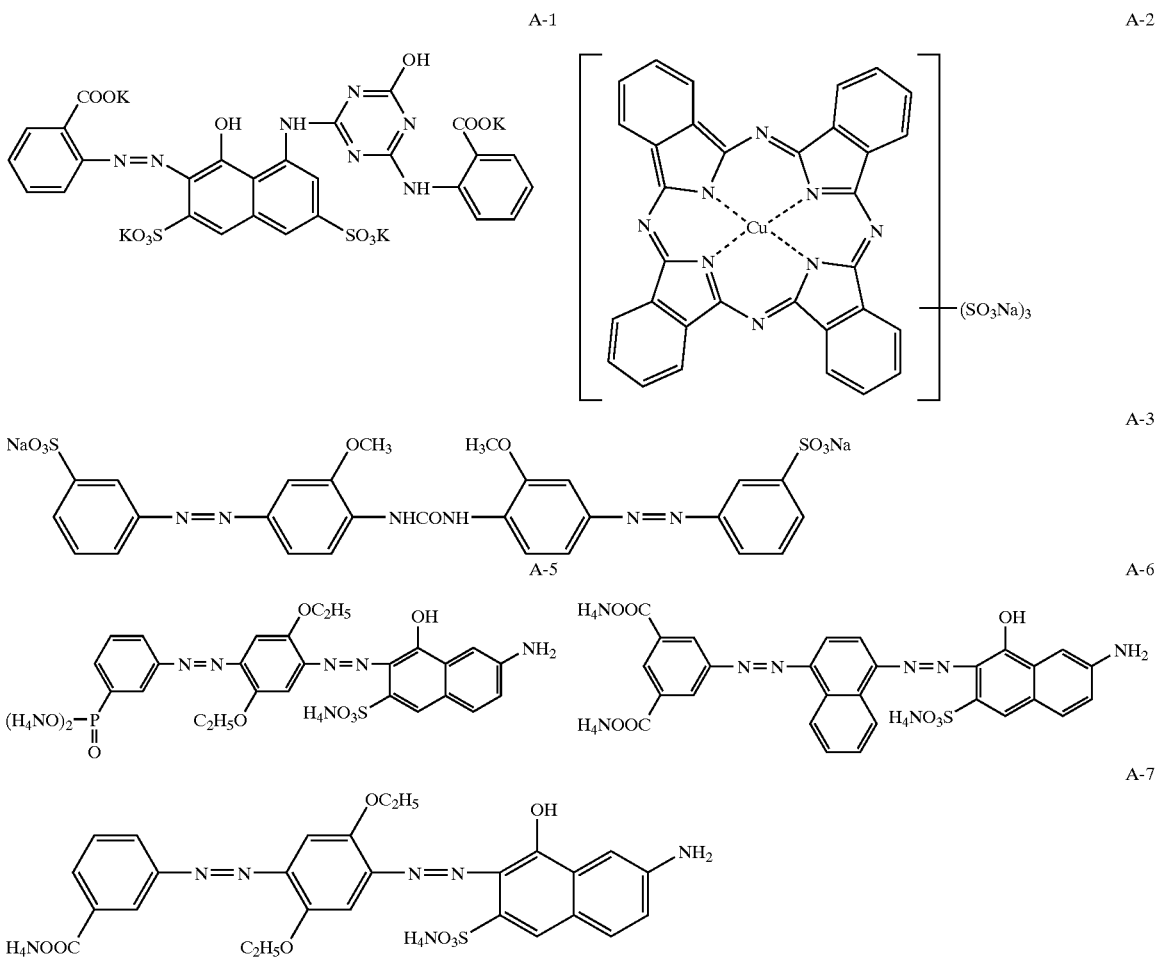

Ink sets 102 to 108 were prepared in the same manner according to Table 4. Amounts of added surfactants were all 1.0% by weight.

A comparative example of ink set 109 was prepared according to the same formulation as with the ink set 101 except for changing the kind of the dye to A-3. Also, another comparative example of ink set 110 was prepared according to the same formulation as with the ink set 101 except for excluding the surfactant.

Subsequently, these ink sets 101 to 110 were respectively charged in cartridges for an ink jet printer PM670C (made by EPSON), and images were printed on ink jet paper photo lustered paper EX made by Fuji Photo Film Co., Ltd. using the printer, followed by conducting the following evaluation.

(1) Ejection Stability

The cartridges were mounted on the printer and, after confirming ejection of the ink through all nozzles, 20 sheets of the paper (A4 size) were printed. Evaluation was conducted according to the following standard.

A: No disturbance of printed letters was observed from the start to the completion of printing.

B: Output with some disturbance of printed letters generated.

C: Disturbance of printed letters was observed from the start to the completion of printing.

(2) Blurring of Fine Line (i) Fine line patterns of yellow, magenta and black were printed, and the printed images were evaluated visually.

○: No blurring.

Δ: Some blurring was observed, but the printed letters were legible.

X: Illegible due to blurring.

(ii) With respect to black, black fine lines were printed after printing solid pattern using a yellow ink, to evaluate blurring due to contact of the two colors as well.

○: No blurring.

Δ: Some blurring was observed, but the printed letters were legible.

X: Illegible due to blurring.

(3) Water Resistance

The resultant images were immersed in deionized water for 10 seconds, then air-dried. Image density of the images was measured before and after immersing in water, and water resistance was evaluated according to the following standard.

A: Residual density was 80% or more.

B: Residual density was 60% to less than 80%.

C: Residual density was less than 60%.

(4) With respect to image preservability, yellow solid image-printed samples were prepared, and the following evaluation was conducted.

(i) Light Fastness

Image density $C_i$ immediately after printing was measured by means of an X-rite 310. After irradiating the image for 10 days with xenon light (85,000 lx) using a Weathermeter made by Atlas Electric Co., Ltd., the image density Cf was again measured, followed by determining dye-remaining ratio, Cf/Ci×100 to evaluate light fastness. The dye-remaining ratio was evaluated at three points of 1, 1.5 and 2, respectively, in reflection density. Samples in which the dye-remaining ratios were 70% or more at the three points were rated as A, samples in which two points were less than 70% in the dye-remaining ratio were rated as B, and samples in which all of the three points were less than 70% in the dye-remaining ratio were rated as C.

(ii) Heat Fastness

Image density of a sample was measured by means of X-rite 310 before and after preserving the sample for 10 days under the conditions of 80° C. and 15% RH to determine the dye-remaining ratio and evaluate the sample. The dye-remaining ratio was evaluated at three points of 1, 1.5 and 2, respectively, in reflection density. Samples in which the dye-remaining ratios were 90% or more at the three points were rated as A, samples in which two points were less than 90% in the dye-remaining ratio were rated as B, and samples in which all of the three points were less than 90% in the dye-remaining ratio were rated as C.

Results thus obtained are tabulated in Table 4.

TABLE 4(A)

| Ink Set | Dye | Surfactant | Ejection Stability | Light Fastness | Heat Fastness | Water Resistance |
|---|---|---|---|---|---|---|
| 101 | 1-1 | W1-18 | A | A | A | A |
| 102 | 1-2 | W1-14 | A | A | A | A |
| 103 | 1-5 | W1-16 | A | A | A | A |
| 104 | 2-1 | W1-28 | A | A | A | A |
| 105 | 2-3 | W2-19 | A | A | A | A |
| 106 | 2-6 | W2-15 | A | A | A | A |
| 107 | 3-1 | W5-4 | A | A | A | A |
| 108 | 3-3 | W5-1 | A | A | A | A |
| 109 | A-3 | W1-18 | A | B | C | B |
| 110 | 1-1 | — | B | A | B | B |

TABLE 4(B)

| Ink Set | Blurring of Fine Line (i) | Blurring of Fine Line (ii) | Notes |
|---|---|---|---|
| 101 | ○ | ○ | Present invention |
| 102 | ○ | ○ | Present invention |
| 103 | ○ | ○ | Present invention |
| 104 | ○ | ○ | Present invention |
| 105 | ○ | ○ | Present invention |
| 106 | ○ | ○ | Present invention |
| 107 | ○ | ○ | Present invention |
| 108 | ○ | ○ | Present invention |
| 109 | Δ | Δ | Comparative Example |
| 110 | X | X | Comparative Example |

It is seen from the results shown in Table 4 that the ink sets (101 to 108) using the ink compositions of the invention are excellent in all of ejection stability, weatherability (light and heat fastness) and water resistance, and provide images suffering no blurring of fine lines.

In addition, in the case of the ink set 109 which contains the surfactant represented by the formula (I) and preferably used in the ink composition of the invention but contains the dye not included in those represented by the formulae (1) to (3), the resultant image has inferior image quality, though ejection stability is good.

In the case of the ink set 110 which uses the dye represented by the formula (1) but does not use the surfactant, the resultant image shows good light fastness, but is inferior with respect to other physical properties.

The ink composition of the invention uses an aqueous ink excellent in handling properties, smell and safety, provides an image having excellent hue, weatherability and water resistance, removes the defects of images such as blurring of fine lines, and shows a high ejection stability.

In addition, an ink jet recording method using the excellent ink composition enables to form an image showing excellent hue, weatherability and water resistance with removing the defects of images such as blurring of fine lines and with excellent ejection stability.

This application is based on Japanese Patent application JP 2001-224805, filed Jul. 25, 2001, the entire content of which is hereby incorporated by reference, the same as if set forth at length.

What is claimed is:

1. An ink composition comprising at least one of water-soluble dyes represented by the following formulae (1) to (3) and a surfactant:

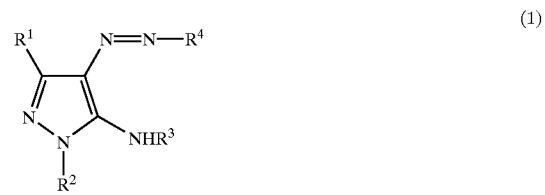

wherein $R^1$, $R^2$ and $R^3$ each independently represents a hydrogen atom, a halogen atom, a cyano group, an alkyl group, a cycloalkyl group, an aralkyl group, an aryl group, an alkylthio group, an arylthio group or ionic hydrophilic group, and $R^4$ represents an optionally substituted heterocyclic group selected from the group consisting of the members of the following Group 1, provided that the water-soluble dye represented by the formula (1) has at least one ionic hydrophilic group within the molecule;

Group 1:

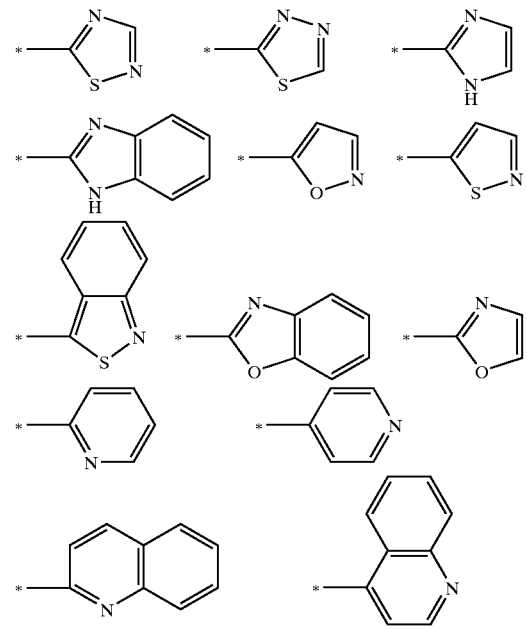

wherein * represents a linking position;

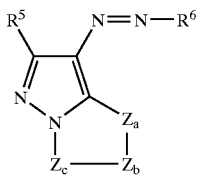
(2)

wherein $R^5$ represents a hydrogen atom, a cyano group, an alkyl group, a cycloalkyl group, an aralkyl group, an aryl group, an alkylthio group, an arylthio group or an ionic hydrophilic group, $Z_a$ represents —N=, —NH— or —C($R^{11}$)=, and $Z_b$ and $Z_c$ each independently represents —N= or —C($R^{11}$)= wherein $R^{11}$ represents a hydrogen atom or a non-metallic substituent, and $R^6$ represents an optionally substituted heterocyclic group selected from the group consisting of the members of the following Group 2, provided that the water-soluble dye represented by the formula (2) has at least one ionic hydrophilic group within the molecule;

Group 2:

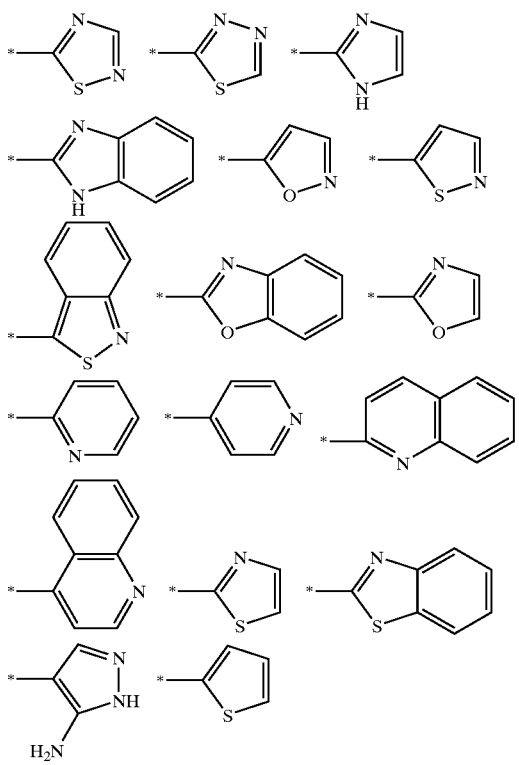

wherein * represents a linking position; and

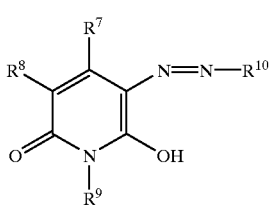
(3)

wherein $R^7$ and $R^9$ each independently represents a hydrogen atom, a cyano group, an alkyl group, a cycloalkyl group, an aralkyl group, an aryl group, an alkylthio group, an arylthio group or an ionic hydrophilic group, $R^8$ represents a hydrogen atom, a halogen atom, an alkyl group, an alkoxy group, an aryl group, an aryloxy group, a cyano group, an acylamino group, a sulfonylamino group, an alkoxycarbonylamino group, an ureido group, an alkylthio group, an arylthio group, an alkoxycarbonyl group, a carbamoyl group, a sulfamoyl group, a sulfonyl group, an acyl group, an alkylamino group, an arylamino group, a hydroxyl group or an ionic hydrophilic group, and $R^{10}$ represents an optionally substituted heterocyclic group selected from the group consisting of the members of the following Group 3, provided that the water-soluble dye represented by the formula (3) has at least one ionic hydrophilic group within the molecule;

Group 3:

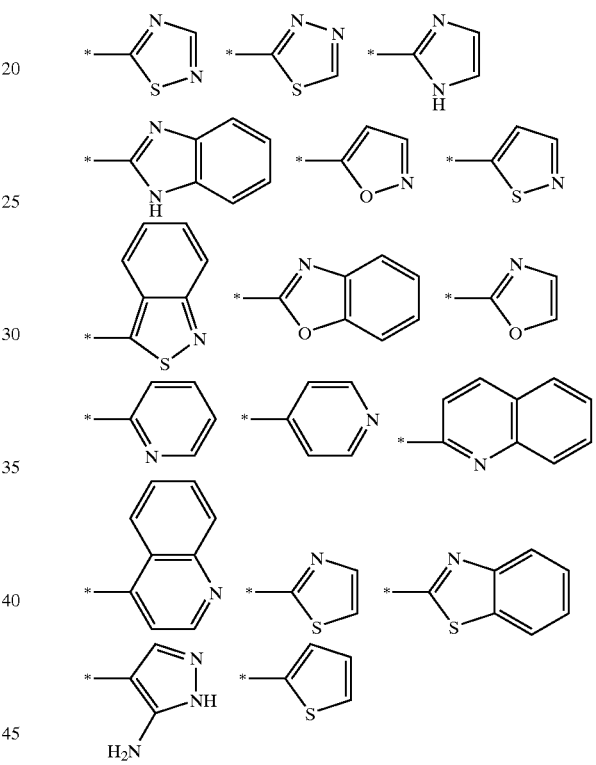

wherein * represents a linking position.

2. The ink composition according to claim 1, wherein the surfactant is a nonionic surfactant.

3. The ink composition according to claim 2, wherein the surfactant is represented by the following formula (I) or (II):

(I)

wherein $R_1$ represents an alkyl group having 5 to 40 carbon atoms, and $m^1$ represents an average number of added ethylene oxide of 2 to 40;

(II)

wherein $R_2$ represents an alkyl group having 5 to 40 carbon atoms, and $m^2$ represents an average number of added ethylene oxide of 2 to 40.

4. The ink composition according to claim 2, wherein the surfactant is represented by the following formula (III):

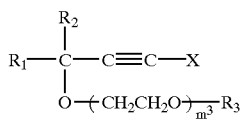
(III)

wherein $R_1$ and $R_2$ each independently represents an alkyl group having 1 to 18 carbon atoms, $R_3$ represents a hydrogen atom, an alkyl group having 1 to 6 carbon atoms or a phenyl group, X represents a hydrogen atom or a group represented by the following formula:

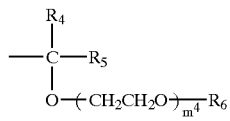

wherein $R_4$ and $R_5$ each independently represents an alkyl group having 1 to 18 carbon atoms, $R_6$ represents a hydrogen atom, an alkyl group having 1 to 6 carbon atoms or a phenyl group, and $m^3$ and $m^4$ each independently represents an average number of added ethylene oxide, with the sum of $m^3$ and $m^4$ being 0 to 100, provided that, when $m^3$ represents 0, $R_3$ represents a hydrogen atom and, when $m^4$ represents 0, $R_6$ represents a hydrogen atom and that, when X represents a hydrogen atom, $m^3$ represents a number of 1 to 100.

5. An ink jet recording method, which comprises ejecting the ink composition according claim 1.

6. An ink jet recording method, which comprises ejecting the ink composition according claim 2.

7. An ink jet recording method, which comprises ejecting the ink composition according claim 3.

8. An ink jet recording method, which comprises ejecting the ink composition according claim 4.

9. An inkjet recording method comprising:

preparing an image receiving material which comprises a support and image receiving layer comprising white inorganic pigment particles; and ejecting the ink composition according to claim 1 to the image receiving material according to a recording signal.

10. An inkjet recording method comprising:

preparing an image receiving material which comprises a support and image receiving layer comprising white inorganic pigment particles; and ejecting the ink composition according to claim 2 to the image receiving material according to a recording signal.

11. An inkjet recording method comprising:

preparing an image receiving material which comprises a support and image receiving layer comprising white inorganic pigment particles; and ejecting the ink composition according to claim 3 to the image receiving material according to a recording signal.

12. An inkjet recording method comprising:

preparing an image receiving material which comprises a support and image receiving layer comprising white inorganic pigment particles; and ejecting the ink composition according to claim 4 to the image receiving material according to a recording signal.

13. The ink composition according to claim 1, wherein the ink composition is produced by at least one of the processes of:

dissolving the at least one of water-soluble dyes and the surfactant in an aqueous medium; and dispersing the at least one of water-soluble dyes and the surfactant in an aqueous medium.

14. The ink composition according to claim 2, wherein the ink composition is produced by at least one of the processes of:

dissolving the at least one of water-soluble dyes and the surfactant in an aqueous medium; and dispersing the at least one of water-soluble dyes and the surfactant in an aqueous medium.

15. The ink composition according to claim 3, wherein the ink composition is produced by at least one of the processes of:

dissolving the at least one of water-soluble dyes and the surfactant in an aqueous medium; and dispersing the at least one of water-soluble dyes and the surfactant in an aqueous medium.

16. The ink composition according to claim 4, wherein the ink composition is produced by at least one of the processes of:

dissolving the at least one of water-soluble dyes and the surfactant in an aqueous medium; and dispersing the at least one of water-soluble dyes and the surfactant in an aqueous medium.

* * * * *